(12) United States Patent
Horiguchi et al.

(10) Patent No.: US 11,535,250 B2
(45) Date of Patent: Dec. 27, 2022

(54) TRAVEL CONTROLLER ADAPTIVE TO ROAD INCLINATION OR BRAKING PERFORMANCE

(71) Applicant: HONDA MOTOR CO., LTD., Tokyo (JP)

(72) Inventors: Takashi Horiguchi, Wako (JP); Yoshimichi Kawamoto, Wako (JP); Satoshi Matsushita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 204 days.

(21) Appl. No.: 17/034,393

(22) Filed: Sep. 28, 2020

(65) Prior Publication Data
US 2021/0094542 A1    Apr. 1, 2021

(30) Foreign Application Priority Data
Sep. 30, 2019   (JP) .............................. JP2019-179645

(51) Int. Cl.
*B60W 30/14* (2006.01)
*B60W 30/16* (2020.01)

(52) U.S. Cl.
CPC .......... *B60W 30/143* (2013.01); *B60W 30/16* (2013.01); *B60W 2510/184* (2013.01); *B60W 2552/15* (2020.02)

(58) Field of Classification Search
CPC combination set(s) only.
See application file for complete search history.

(56) References Cited

U.S. PATENT DOCUMENTS

2009/0234550 A1* 9/2009 Takeuchi ........ B60W 30/18009
701/70
2017/0297573 A1* 10/2017 Fraser ................. B60W 30/143
(Continued)

FOREIGN PATENT DOCUMENTS

| JP | H11-20496 A | 1/1999 |
|---|---|---|
| JP | 2000-238629 A | 9/2000 |

(Continued)

OTHER PUBLICATIONS

Office Action received in corresponding Japanese application No. 2019-179645 dated May 10, 2022 with English translation (6 pages).

*Primary Examiner* — Anne Marie Antonucci
*Assistant Examiner* — Amelia Vorce
(74) *Attorney, Agent, or Firm* — Rankin, Hill & Clark LLP

(57) ABSTRACT

A travel controller including an information acquisition part configured to acquire brake state information of a braking device of a host vehicle and an ACC-ECU configured to perform travel control, wherein the travel control includes constant speed travel control and headway travel control. The constant speed travel control is configured to control the host vehicle to travel at constant speed in accordance with a preset target vehicle speed. The headway travel control is configured to control the host vehicle to travel by following another vehicle travelling ahead so that a predetermined inter-vehicle distance in maintained with the other vehicle and the host vehicle travels in accordance with the target vehicle speed. In the ACC-ECU, when a braking performance index of the host vehicle has a "declined value", a target acceleration of Example 1 takes a reduced value compared to the target acceleration of Comparative Example for a common distance difference.

4 Claims, 9 Drawing Sheets

(56) References Cited

U.S. PATENT DOCUMENTS

| | | | |
|---|---|---|---|
| 2018/0099580 A1* | 4/2018 | Kumazaki | B60W 20/30 |
| 2018/0148063 A1* | 5/2018 | Tatsushiro | B60W 30/18009 |
| 2018/0244269 A1* | 8/2018 | Carlsson | B60W 30/1884 |
| 2018/0326852 A1* | 11/2018 | Shiozawa | B60W 30/00 |
| 2019/0003839 A1* | 1/2019 | Hu | G05D 1/0088 |
| 2019/0315354 A1* | 10/2019 | Kleemann | B60W 30/1843 |

FOREIGN PATENT DOCUMENTS

| | | |
|---|---|---|
| JP | 2005-028896 A | 2/2005 |
| JP | 2015-110378 A | 6/2015 |
| JP | 2017-043237 A | 3/2017 |

\* cited by examiner

TRAVEL CONTROLLER ADAPTIVE TO ROAD INCLINATION OR BRAKING PERFORMANCE

CROSS-REFERENCE TO RELATED APPLICATIONS

This application is based upon and claims the benefit of priority from Japanese Patent Application No. 2019-179645 filed Sep. 30, 2019, the entire contents of which are incorporated herein by reference.

TECHNICAL FIELD

The disclosure relates to a travel controller for performing travel control of a host vehicle.

BACKGROUND ART

There is currently a trend to develop elemental technologies for automating the driving of vehicles that ease the burden of drivers regarding driving operation. A travel control technology called adaptive cruise control (ACC) is one known elemental technology for achieving automated driving.

In a travel controller with an ACC (adaptive cruise control) function, travel control is achieved by controlling a drive system and braking system of a host vehicle in an integrated manner, wherein the travel control includes (i) constant speed travel control that controls a host vehicle to travel at constant speed in accordance with a target vehicle speed, and (ii) headway travel control that controls a host vehicle to travel by following another vehicle travelling ahead, wherein a predetermined inter-vehicle distance is maintained with the other vehicle.

An example of such a travel controller is shown in Patent Literature 1 (Japanese Unexamined Patent Application Publication No. 2017-043237), in which the travel controller prohibits ACC operation when the likelihood of brake fade occurring reaches a predetermined critical level (Patent Literature 1, paragraph 0069).

According to the travel controller of Patent Literature 1, because ACC operation is prohibited when the likelihood of brake fade occurring reaches a predetermined critical level, the travel controller can prevent brake fade from occurring while the travel control of ACC is in operation.

According to the travel controller of Patent Literature 1, when the likelihood of brake fade occurring exceeds a first threshold, a brake fade flag is turned on and ACC operation is prohibited (i.e., cancelled) (Patent Literature 1, paragraph 0069).

Furthermore, according to the travel controller of Patent Literature 1, if the level of likelihood of brake fade occurring drops below a second threshold that is lower than the first threshold, the brake fade flag is turned off and ACC operation is resumed (Patent Literature 1, paragraph 0044, 0060).

However, the travel controller according to Patent Literature 1 does not disclose nor suggest a travel controller that reduces the level of likelihood of brake fade occurring while ACC (travel control) is in operation. Thus, there exists a need for improvement in terms of extending an operation period of ACC as much as possible and contributing to improving the operation rate of ACC.

SUMMARY

The disclosure has been made in view of the abovementioned situation. It is an object of the disclosure to provide a travel controller that extends the operation time of travel control as much as possible while the travel control is in operation and contributes to improving the operation rate of travel control.

In order to solve the above problems, the disclosure is a travel controller for performing travel control of a host vehicle, wherein the travel controller includes the following main features. The travel controller includes an information acquisition part that is configured to acquire brake state information of a braking device that the host vehicle is equipped with and a travel control part that is configured to perform travel control. The travel control performed includes constant speed travel control, headway travel control, or constant speed travel control and headway travel control. The constant speed travel control is configured to control the host vehicle to travel at constant speed in accordance with a target vehicle speed, and the headway travel control is configured to control the host vehicle to travel by following another vehicle travelling ahead so that a target inter-vehicle distance is maintained with the other vehicle. In the constant speed travel control, when an actual vehicle speed drops below the target vehicle speed, the travel control part is configured to (i) calculate target acceleration based on a difference between the target vehicle speed and the actual vehicle speed and (ii) perform the constant speed travel control so that the actual vehicle speed is brought closer to the target vehicle speed. When the target acceleration is calculated, if a braking performance index based on the brake state information acquired with the information acquisition part has declined relative to a predetermined evaluation threshold while the constant speed travel control has been in operation, then the target acceleration is corrected so that (a) the target acceleration is reduced compared to if the braking performance index has not declined relative to the evaluation threshold and (b) the constant speed travel control is performed so that the actual vehicle speed is brought closer to the target vehicle speed based on the corrected target acceleration.

A travel controller according to the disclosure is capable of extending an operation time of travel control as much as possible while the travel control is in operation and contributing to improving an operation rate of the travel control.

DESCRIPTION OF EMBODIMENTS

Figure 1:
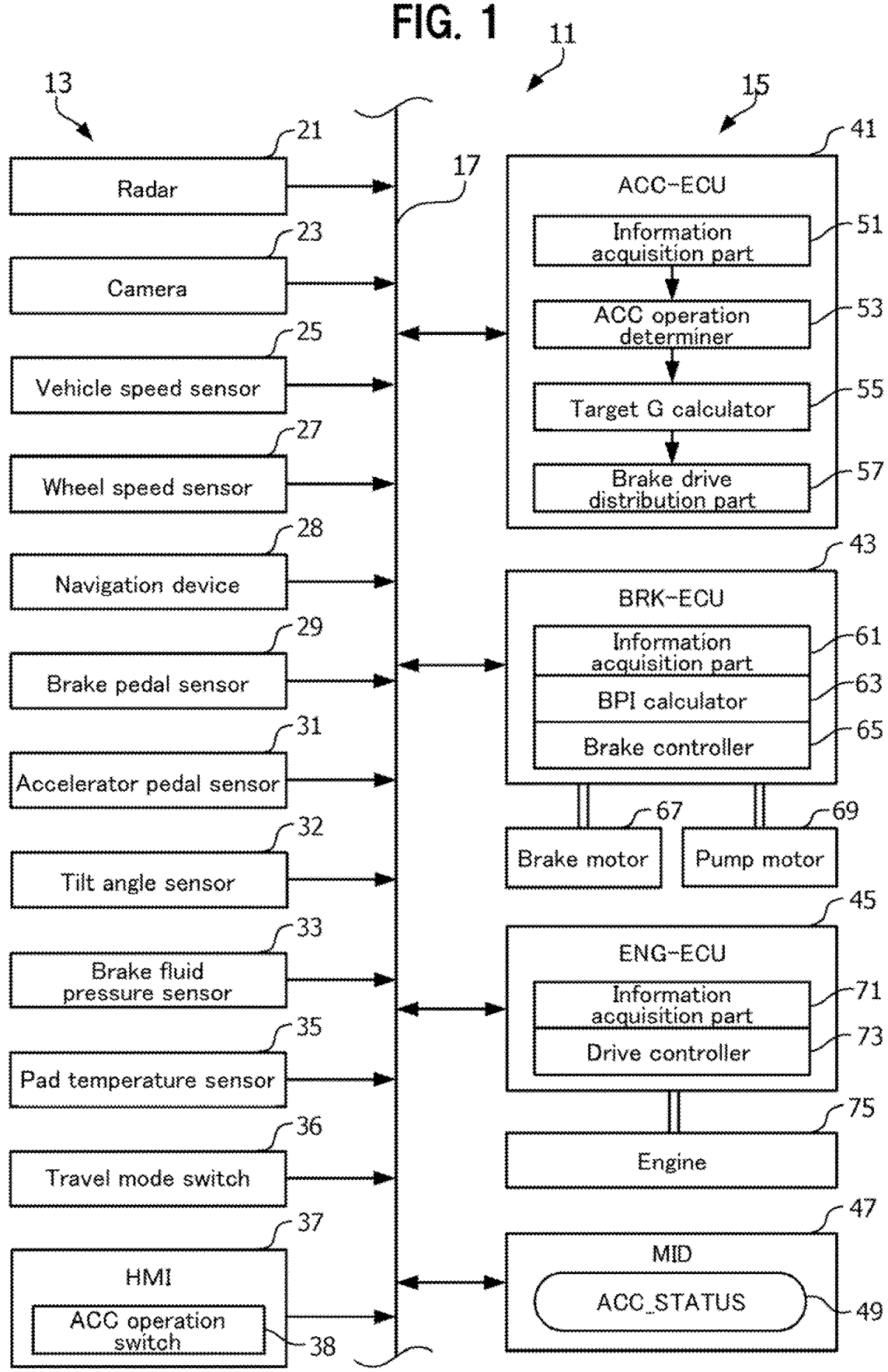
FIG. 1 is a block diagram showing the outline of a travel controller according to an embodiment of the disclosure.

Details of a travel controller according to embodiments of the disclosure are given below with reference to drawings when necessary.

Note that as a general rule, components with a common function or components with a mutually corresponding function use a common reference symbol in the drawings. Furthermore, for convenience of explanation, components may be shown schematically with shapes and sizes of the components modified or exaggerated.

Overview of Travel Controller 11 According to Embodiment of Disclosure

First, with reference to FIG. 1, an overview of a travel controller 11 according to an embodiment of the disclosure is described. FIG. 1 is a block diagram showing the outline of a travel controller 11 according to an embodiment of the disclosure.

When, for example, an actual vehicle speed RV becomes lower than a target vehicle speed SV, a travel controller 11 according to an embodiment of the disclosure calculates a target acceleration Gtg based on a difference DV between the target vehicle speed SV and the actual vehicle speed RV. When the target acceleration Gtg is calculated, if a braking performance index BPI (to be described in detail later) based on brake state information (a pad temperature Tpd) has declined relative to a predetermined evaluation threshold EV_th while the constant speed travel control of ACC (adaptive cruise control) has been in operation, the travel controller 11 performs correction to the target acceleration Gtg so that the target acceleration Gtg is reduced compared to if the braking performance index BPI has not declined relative to the evaluation threshold EV_th, and performs constant speed travel control so that the actual vehicle speed RV is brought closer to the target vehicle speed SV based on the corrected target acceleration Gtg. Detailed description is given later.

Furthermore, for the headway travel control of the ACC, when an actual inter-vehicle distance RD becomes greater and the target inter-vehicle distance TD, a travel controller 11 according to the embodiment of the disclosure calculates a target acceleration Gtg based on a difference ΔD between an actual inter-vehicle distance RD and a target inter-vehicle distance TD. When the target acceleration Gtg is calculated, if a braking performance index BPI based on brake state information (a pad temperature Tpd) has declined relative to a predetermined evaluation threshold EV_th while the headway travel control has been in operation, the travel controller 11 performs correction to the target acceleration Gtg so that the target acceleration Gtg is reduced compared to if the braking performance index BPI has not declined relative to the evaluation threshold EV_th. Detailed description is given later.

As shown in FIG. 1, in order to achieve the abovementioned functions, a travel controller 11 according to an embodiment of the disclosure is configured so that input system elements 13 and output system elements 15 are connected via a communication medium 17 to permit data communication. The communication medium 17 may, for example, be a Controller Area Network (CAN).

As shown in FIG. 1, the input system elements 13 include a radar 21, a camera 23, a vehicle speed sensor 25, a wheel speed sensor 27, a navigation device 28, a brake pedal sensor 29, an accelerator pedal sensor 31, a tilt angle sensor 32, a brake fluid pressure sensor 33, a pad temperature sensor 35, a travel mode switch 36, and a human-machine interface 37 (an HMI 37).

As shown in FIG. 1, the output system elements 15 include an ACC-ECU 41, a BRK-ECU 43, an ENG-ECU 45, and an MID-ECU 47 (where "MID" stands for multi-information display).

The radar 21 includes a function for acquiring distribution information of a target by irradiating a target with a radar wave and receiving a radar wave reflected from the target, the target including another vehicle travelling in front of the host vehicle OC, and the distribution information of a target including a distance to the target and a direction of the target. The distribution information of a target may instead be acquired based on information of an image of an area in the direction of travel of the host vehicle OC taken by a camera 23. Alternatively, the distribution information of a target may be acquired with the radar 21 and camera 23.

A radar such as a laser radar, a microwave radar, a millimeter-wave radar, or an ultrasonic radar may be used as the radar 21 as deemed appropriate. The radar 21 may, for example, be installed on the back side of a front grille of the host vehicle OC. The distribution information of a target acquired by the radar 21 is sent to the ACC-ECU 41 via the communication medium 17.

The camera 23 has an optical axis that is inclined in an obliquely downward direction in the front of the host vehicle OC. The camera 23 includes a function for capturing an image of an area in the direction of travel of the host vehicle OC. A camera such as a CMOS (complementary metal-oxide semiconductor) camera or a CCD (charge-coupled device) camera may be used as the camera 23 as deemed appropriate. The camera 23 may, for example, be installed at the upper center area of a windshield (not shown in figure) of the host vehicle OC.

Information of an image of an area in the direction of travel of the host vehicle OC taken by the camera 23 is sent to the ACC-ECU 41 via the communication medium 17 in the form of an image signal such as an interlaced image signal generated with NTSC (National Television Standards Committee) interlacing.

The vehicle speed sensor 25 includes a function for detecting a travel speed V of a vehicle ("vehicle speed"). Information on vehicle speed V that is detected by the vehicle speed sensor 25 is sent via the communication medium 17 to the BRK-ECU 43 and the like.

The wheel speed sensor 27 includes a function for detecting a rotational speed ("wheel speed") of each wheel (not shown in figure) that is installed on the host vehicle OC. Information on the wheel speed of each wheel detected by the wheel speed sensor 27 is sent via a communication medium 17 to the BRK-ECU 43 and the like.

The navigation device 28 includes a function for acquiring information regarding the current location of the host vehicle OC. Information regarding the current location of the host vehicle OC acquired by the navigation device 28 is sent via the communication medium 17 to the ACC-ECU 41 and the like.

The brake pedal sensor 29 includes a function for detecting the amount of brake pedal operation by a driver of the host vehicle OC and the torque induced upon depression of a brake pedal (not shown in figure). Brake operation information concerning the amount of brake pedal operation and the induced torque upon depression of the brake pedal that are detected by the brake pedal sensor 29 is sent to the BRK-ECU 43 and the like via the communication medium 17.

The accelerator pedal sensor 31 includes a function for detecting the amount of accelerator pedal operation by the driver (an accelerator pedal is not shown in figure). Acceleration and deceleration operation information concerning the amount of accelerator pedal operation that is detected by the accelerator pedal sensor 31 is sent via the communication medium 17 to the ENG-ECU 45 and the like.

The tilt angle sensor 32 includes a function for acquiring information on the tilt angle of the host vehicle OC. Information on the tilt angle of the host vehicle OC acquired by the tilt angle sensor 32 is sent via the communication medium 17 to the ACC-ECU 41 and the like.

The brake fluid pressure sensor 33 includes a function for detecting brake fluid pressure in a fluid supply passage of a VSA unit (Vehicle Stability Assist; not shown in figure; VSA is a registered trademark of the applicant) of a brake hydraulic system. Information on fluid pressure in the fluid supply passage of the VSA unit that is detected by the brake fluid pressure sensor 33 is sent to the BRK-ECU 43 and the like via the communication medium 17.

The pad temperature sensor 35 is installed close to a brake pad (not shown in figure) and includes a function for detecting a pad temperature Tpd of the brake pad that is generated due to friction braking. Information on the pad temperature Tpd (brake state information) that is detected by the pad temperature sensor 35 is sent to the BRK-ECU 43 and the like via the communication medium 17.

Figure 2A:
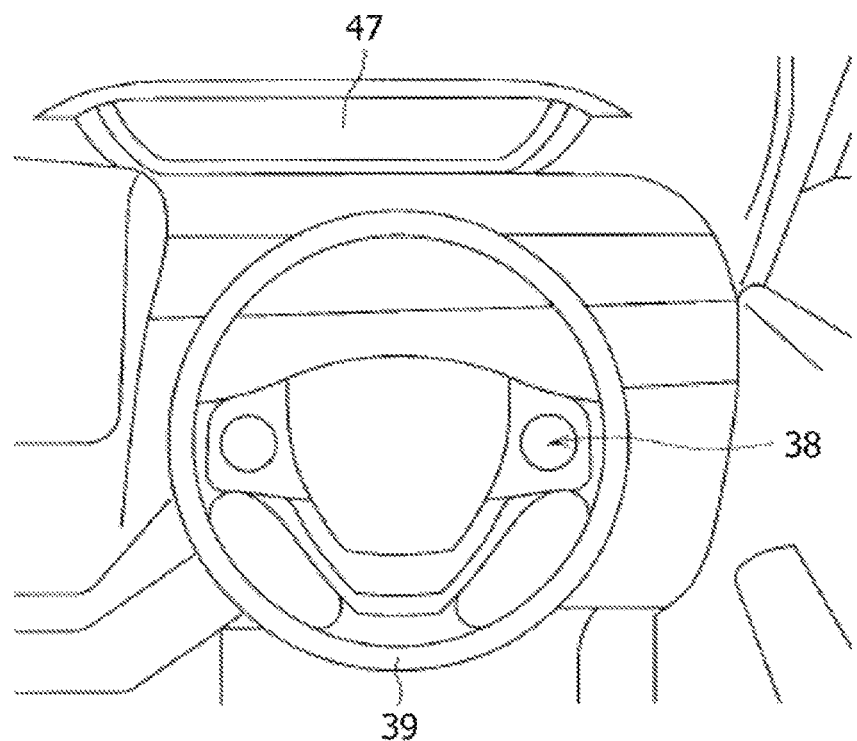
FIG. 2A is an external view of an operation switch concerning adaptive cruise control (ACC) where the operation switch is installed on a steering wheel.

The travel mode switch 36 may, for example, be installed on the steering wheel 39 (see FIG. 2A). The travel mode switch 36 is used to select and input ("to set") a travel mode from a number of travel modes that the host vehicle possesses. Travel mode settings that may be selected with the travel mode switch 36 may, for example, include a Comfort/Eco mode, Normal mode, Sports mode, and Sports Plus mode ("Spo+"). The travel mode switch 36 corresponds to the "travel mode setting part" of the disclosure.

The HMI (human-machine interface) 37 includes an operation switch for adaptive cruise control 38 (hereafter an "ACC operation switch 38"; see FIG. 1). The ACC operation switch 38 is used to input setting information concerning the ACC. The setting information concerning the ACC that is input using the ACC operation switch 38 is sent to the ACC-ECU 41 and the like via the communication medium 17.

Figure 2B:
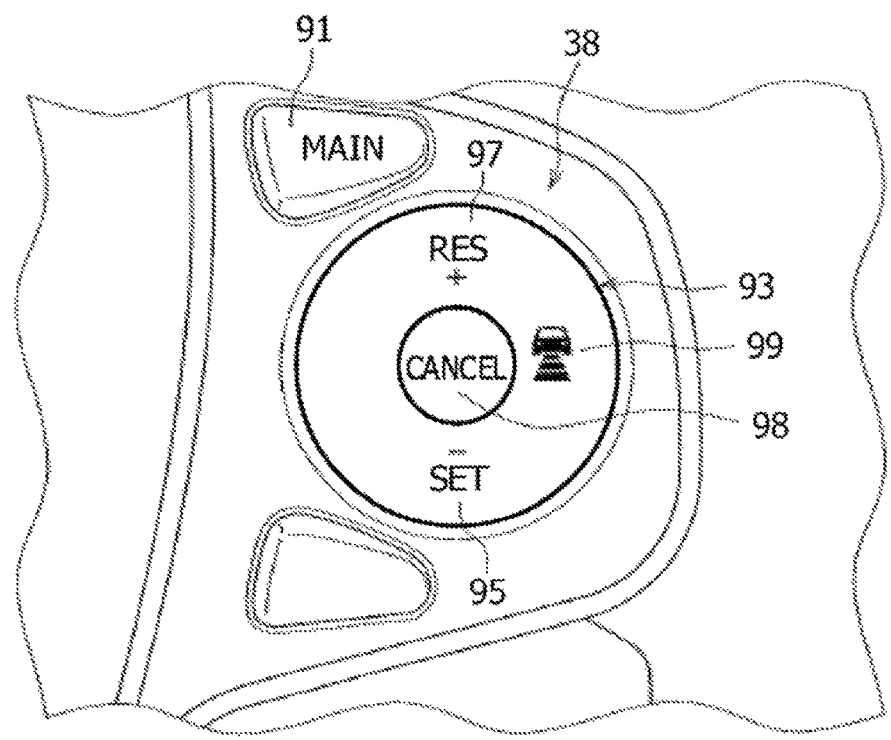
FIG. 2B is an enlarged external view of the operation switch concerning adaptive cruise control (ACC).

The peripheral configuration of the ACC operation switch 38 is explained with reference to FIGS. 2A and 2B. FIG. 2A is an external view of the ACC operation switch 38 of the ACC that is installed on a steering wheel 39. FIG. 2B is an enlarged external view of the ACC operation switch 38.

As shown in FIG. 2A, the ACC operation switch 38 is installed, for example, on a steering wheel 39. Close to a driver's line of sight in the direction of travel is installed a multi-information display 47 (MID 47) for displaying information such as a vehicle speed V, a shift position, and setting information concerning the ACC (ACC_STATUS 49; see FIG. 1).

Next, adaptive cruise control (ACC) is explained. The ACC is a function of performing travel control of a host vehicle OC so that when a predetermined criterion for headway travel control is met, the host vehicle OC follows another vehicle (a "preceding vehicle") that is travelling in front of the host vehicle OC.

With conventional cruise control, if a required vehicle speed V is set in advance, the host vehicle OC is controlled to travel so that the vehicle speed V is maintained at a target speed.

In comparison to the conventional cruise control, the ACC does not only include a function of maintaining vehicle speed V of the host vehicle OC to a target vehicle speed. The ACC also includes a function where, if a required inter-vehicle distance is set in advance, the host vehicle OC is controlled to travel by following another vehicle (a "preceding vehicle") travelling ahead in the advancing direction and the lane of the host vehicle OC so that the inter-vehicle distance with the preceding vehicle is maintained at a target inter-vehicle distance while the vehicle speed V of the host vehicle OC is maintained within a range up to a target vehicle speed.

To enable the setting information concerning the ACC to be input, the ACC operation switch 38 includes a main switch 91 (MAIN) and a circular menu switch 93. The main switch 91 is a switch to operate when activating the ACC. The circular menu switch 93 is a switch to operate when inputting the setting information concerning the ACC.

As shown in FIG. 2B, the circular menu switch 93 includes a set (−SET) switch 95, a resume (RES+) switch 97, a cancel (CANCEL) switch 98, and a distance switch 99.

The set (−SET) switch 95 is a switch to operate when manipulating the setting information concerning the ACC in the following ways: (i) setting the ACC, and (ii) adjusting the target vehicle speed to a lower value.

The resume (RES+) switch 97 is a switch to operate when manipulating the setting information concerning the ACC in the following ways: (i) resetting the ACC, and (ii) adjusting the target vehicle speed to a higher value.

The cancel (CANCEL) switch 98 is a switch to operate when cancelling ACC operation. Note that the ACC operation may also be cancelled by pressing the main switch 91.

The distance switch 99 is a switch to operate when setting the inter-vehicle distance between the host vehicle OC and a preceding vehicle. The setting information on the inter-vehicle distance may be changed each time by pressing the distance switch 99. For example, the inter-vehicle distance may be switched sequentially among four levels starting from a longest distance setting to a long distance setting to an intermediate distance setting to a short distance setting. Note that the embodiment is configured so that the value that is set for the inter-vehicle distance fluctuates based on how high or low the vehicle speed V of the host vehicle OC is. To elaborate, the lower the vehicle speed V is, the shorter the set value of the inter-vehicle distance becomes.

The travel controller 11 is described further by referring back to FIG. 1.

As shown in FIG. 1, the ACC-ECU 41 belonging to the output system elements 15 includes an information acquisition part 51, an ACC operation determiner 53, a target G calculator 55, and a brake drive distribution part 57.

The ACC-ECU 41 performs adaptive cruise control (ACC; corresponds to the term "travel control" used in claims of this application) that includes constant speed travel control and headway travel control. The constant speed travel control controls the host vehicle OC to travel at constant speed based on a preset vehicle speed V. The headway travel control controls the host vehicle OC to travel by following another vehicle travelling ahead in the advancing direction and the lane of the host vehicle OC so that a predetermined inter-vehicle distance is maintained with the other vehicle.

In other words, the ACC-ECU 41 performs adaptive cruise control (ACC; travel control) of the host vehicle OC, wherein the ACC includes acceleration control and deceleration control, and wherein the inter-vehicle distance with the preceding vehicle is maintained at the set inter-vehicle distance without requiring the driver to operate the accelerator pedal (not shown in figure) or brake pedal (not shown in figure), while keeping the vehicle speed V of the host vehicle OC within a range up to the target vehicle speed.

Furthermore, the ACC-ECU 41 cancels the operation of the ACC if the braking performance index BPI based on the brake state information acquired while the ACC is in operation declines relative to a predetermined first reference threshold EV_th1.

A state in which the ACC is in operation refers to a state where the adaptive cruise control is being implemented. The brake state information refers to information that represents the brake state of the braking device that the host vehicle OC is equipped with. Other than a pad temperature Tpd, an integral of the brake fluid pressure, a difference in vehicle speed before and after deceleration may, for example, be adopted as deemed appropriate as brake state information.

The braking performance index BPI is information on an evaluation scale representing the brake state of a braking device that the host vehicle OC is equipped with. For example, the braking performance index BPI represents the level of braking performance that the host vehicle OC possesses and also represents the level of likelihood of brake fade occurring. The braking performance index BPI based on brake state information may be acquired by applying a conversion table to brake state information (such as a pad temperature Tpd).

The first reference threshold EV_th1 is a reference value from which the relative position of a braking performance index BPI according to the host vehicle OC may be judged, and is used to determine whether or not the level of braking performance that the host vehicle OC possesses (the level of likelihood of brake fade occurring) has declined to a level where the adaptive cruise control function of the ACC cannot sufficiently be secured.

After cancelling the operation of the ACC, the ACC-ECU 41 may allow the ACC to resume operation if, when the information acquisition part 51 acquires travelling road information that the road on which the host vehicle OC travels continues to be a descending road, the braking performance index BPI based on the brake state information improves relative to a second reference threshold EV_th2 that is set to a value on a higher evaluation side compared to the first reference threshold EV_th1.

The second reference threshold EV_th2 is s a reference value that is used to determine whether or not the level of braking performance of the host vehicle OC (the level of likelihood of brake fade occurring) has improved to a level where an adaptive cruise control function of the ACC can sufficiently be secured.

Furthermore, the ACC-ECU 41 may allow the ACC to resume operation after the ACC operation has been cancelled even when the braking performance index BPI based on the brake state information has declined relative to the second reference threshold EV_th2 if the information acquisition part 51 acquires travelling road information that the road on which the host vehicle OC travels is no longer a descending road.

In this way, the timing to resume operation of the ACC is advanced by taking into consideration the transition in the travelling circumstance of the host vehicle OC to that of a smaller brake load (a transition from travelling on a descending road to travelling on a flat road). This setting of the timing to resume operation of the ACC that takes into account the transition of the travelling circumstance contributes to improving the driver's convenience. This function is described in more detail later.

The ACC-ECU 41 is configured from a microcomputer that includes a central processing unit (CPU), a read-only memory (ROM), a random-access memory (RAM), and the like. The microcomputer reads a program and data that are stored in the ROM and executes the program. The microcomputer controls the execution of various functions of the ACC-ECU 41 including (i) a function to acquire various information, (ii) an ACC operation determination function, (iii) a target G calculation function, and (iv) a brake and drive distribution function.

The ACC-ECU 41 corresponds to a part of the travel control part of the disclosure.

The information acquisition part 51 includes a function for acquiring various information including (i) distribution information of a target that is acquired by the radar 21; (ii) information of an image of an area in the direction of travel of the host vehicle OC that is captured by the camera 23; (iii) information on vehicle speed V that is detected by the vehicle speed sensor 25; (iv) information concerning the current location of the host vehicle OC that is acquired by the navigation device 28; (v) information on a tilt angle that is detected by the tilt angle sensor 32; (vi) information on the braking performance index BPI that is calculated by the BPI calculator 63 of the BRK-ECU 43 (description of the BRK-ECU 43 is given later); (vii) travel mode information that is selected and input using the travel mode switch 36; and (viii) setting information concerning the ACC that is input via the ACC operation switch 38 belonging to the human-machine interface 37 (an HMI 37).

Examples of information concerning the current location of the host vehicle OC that is acquired by the information acquisition part 51 include the following: information on which of the three types of road the host vehicle OC travels on, namely a descending road LRD, a flat road FRD, or an ascending road; and information concerning the inclination of the road on which the host vehicle OC travels when the road is a descending road LRD.

Note that the travel controller 11 according to an embodiment of the disclosure may adopt a configuration that includes an external communication function such as a vehicle-to-vehicle communication function, a road-to-vehicle communication function, or a web communication function. With this configuration, it is possible for the information acquisition part 51 of the ACC-ECU 41 to acquire information concerning the current location of the host vehicle OC via the external communication function.

Information on which of the three types of road the host vehicle OC travels on, the three types of road being a descending road LRD, a flat road FRD, and an ascending road, and information concerning the inclination of the road on which the host vehicle OC travels when the road is a descending road LRD may, for example, be acquired in one or more of the following ways as deemed appropriate: by referencing the distribution information of a target that is acquired by the radar 21; by carrying out image analysis of image information of an area in the direction of travel of the host vehicle OC that is captured by the camera 23; by referencing cartographic information (including altitude data) concerning the current location of the host vehicle OC that is acquired by the navigation device 28; and by referencing information concerning the current location of the host vehicle OC that is acquired via the external communication function.

Also, the information on which of the three types of road the host vehicle OC travels on, the three types of road being a descending road LRD, a flat road FRD, and an ascending road, may be acquired based on an integrated value of tilt angle data of predetermined road sections. The tilt angle data for each road section may be calculated through integration of the tilt angle data of the host vehicle OC that is detected by the tilt angle sensor 32 for the respective road section.

The ACC operation determiner 53 includes a function to make a decision concerning the operation of the ACC (whether to permit the operation of the ACC, whether to permit the resuming of ACC operation, or whether to cancel the operation of the ACC) based on information on the braking performance index BPI that the information acquisition part 51 acquires via the BRK-ECU 43 and information concerning the current location of the host vehicle OC. More description regarding the decisions concerning the operation of the ACC is given later.

The target G calculator 55 includes a function to calculate the target acceleration or deceleration (a "target G") based on information such as (a) target distribution information acquired by the information acquisition part 51; (b) image information of an area in the direction of travel of the host vehicle OC; (c) information concerning vehicle speed V; and/or (d) setting information concerning the ACC.

More specifically, for the constant speed travel control of the ACC, the target G calculator 55 calculates the target acceleration Gtg when the actual vehicle speed RV becomes lower than the target vehicle speed SV. The target acceleration Gtg is calculated based on the difference DV between the target vehicle speed SV and the actual vehicle speed RV. When calculating the target acceleration Gtg, if the braking performance index BPI based on brake state information (a pad temperature Tpd) has declined relative to a predetermined evaluation threshold EV_th during the operation of the constant speed travel control, then correction is performed to reduce the target acceleration Gtg to a value that is lower compared to if the braking performance index BPI has not declined relative to the evaluation threshold EV_th.

Note that any value of the braking performance index BPI may be adopted as the predetermined evaluation threshold EV_th as deemed appropriate.

For the headway travel control of the ACC, the target G calculator 55 calculates the target acceleration Gtg when the actual inter-vehicle distance RD becomes wider than the target inter-vehicle distance TD. The target acceleration Gtg is calculated based on the difference ΔD between the actual inter-vehicle distance RD and the target inter-vehicle distance TD. When calculating the target acceleration Gtg, if the braking performance index BPI based on brake state information (a pad temperature Tpd) has declined relative to the evaluation threshold EV_th during the operation of the headway travel control, then correction is performed to reduce the target acceleration Gtg to a value that is lower compared to if the braking performance index BPI has not declined relative to the evaluation threshold EV_th.

The brake drive distribution part 57 includes a function for (a) calculating the distribution ratio of brake and drive and (b) performing torque distribution related to brake and drive in accordance with the calculated distribution ratio. The distribution ratio is calculated based on information such as information on vehicle speed V and information on the target G that is calculated by the target G calculator 55.

The BRK-ECU 43 belongs to the output system elements 15 like the ACC-ECU 41. As shown in FIG. 1, the BRK-ECU 43 includes an information acquisition part 61, a BPI calculator 63, and a brake controller 65.

The BRK-ECU 43 includes a function for generating a brake fluid pressure (a secondary fluid pressure) for applying a brake on a host vehicle OC by operating a motor cylinder device (see, for example, Japanese Unexamined Patent Application Publication No. 2015-110378; not shown) that is driven by a brake motor 67 in accordance with the level of a brake fluid pressure (a primary fluid pressure) that is generated in a master cylinder (not shown) by the brake operation of a driver.

Also, the BRK-ECU 43 includes, for example, a function for controlling the braking forces of the four wheels of the host vehicle OC in accordance with the target fluid pressures of the individual wheels by driving a pressure pump (not shown) using a pump motor 69 upon receipt of a deceleration control instruction sent from the brake drive distribution part 57.

The master cylinder, motor cylinder device, brake motor 67, and pump motor 69 correspond to the braking device of the disclosure.

The BRK-ECU 43 is configured from a microcomputer that includes a central processing unit (CPU), a read-only memory (ROM), a random-access memory (RAM), and the like. The microcomputer reads a program and data that are stored in the ROM, executes the program, and controls the execution of various functions of the BRK-ECU 43 including (a) a function for acquiring various information, (b) a function for calculating a braking performance index, and (c) a brake control function based on ACC operation or brake operation.

The BRK-ECU 43 corresponds to parts of a braking device and travel control part of the disclosure.

The information acquisition part 61 includes a function for acquiring various information including (a) information on the vehicle speed V that is detected by the vehicle sensor 25; (b) information on the wheel speed of individual wheels detected by the wheel speed sensor 27; (c) brake operation information on the amount of brake pedal operation and induced torque upon depression of a pedal that are detected by the brake pedal sensor 29; (d) information on fluid pressure in the fluid supply route of the VSA device that is detected by the brake fluid pressure sensor 33; and (e) brake control information sent from the brake drive distribution part 57 of the ACC-ECU 41.

The BPI calculator 63 uses the pad temperature Tpd (the measured value) that is detected by the pad temperature sensor 35 as brake state information and, with referencing a conversion table, performs calculation to convert a pad temperature Tpd to a braking performance index BPI.

When the braking performance index BPI based on the pad temperature Tpd is on the lower evaluation side relative to the first reference threshold EV_th1, there is a negative linear correlation between the pad temperature Tpd and braking performance index BPI. In other words, when the braking performance index BPI based on the pad temperature Tpd is on the lower evaluation side relative to the first reference threshold EV_th1, the braking performance index BPI declines with higher pad temperature Tpd.

Note that a configuration may be adopted in which, for example, a pad temperature Tpd is estimated based on information on vehicle speed V and information on fluid pressure in the fluid supply route of the VSA device, and then the estimated pad temperature Tpd is converted to a braking performance index BPI. The calculation of a braking performance index BPI is not limited to this configuration, however.

The brake controller 65 controls the braking forces of the four wheels of the host vehicle OC in accordance with the target fluid pressures of the individual wheels by (a) performing brake control of the host vehicle OC by operating the motor cylinder device that is driven by the brake motor 67, and (b) driving a pressure pump using the pump motor 69 as needed. The braking motor 67 is driven based either on information on the brake operation by the driver that is acquired via the brake pedal sensor 29 or on brake control information that is sent from the brake drive distribution part 57 of the ACC-ECU 41.

The ENG-ECU 45 belongs to the output system elements 15 like the ACC-ECU 41 and BRK-ECU 43. As shown in FIG. 1, the ENG-ECU 45 includes an information acquisition part 71 and a drive controller 73.

The ENG-ECU 45 includes a function to perform drive control of an internal combustion engine 75 based either on information on acceleration operation (the amount the accelerator pedal is depressed) of the driver that is acquired via the accelerator pedal sensor 31 or on drive control information that is sent from the brake drive distribution part 57 of the ACC-ECU 41.

Explained further, the ENG-ECU 45 controls the driving of the internal combustion engine 75 by controlling components of the host vehicle OC such as a throttle valve (not shown in figure) that adjusts the air intake of the internal combustion engine 75, an injector (not shown in figure) that injects fuel gas, and/or a spark plug (not shown in figure) for igniting fuel.

The ENG-ECU 45 is configured from a microcomputer that includes a central processing unit (CPU), a read-only memory (ROM), and a random-access memory (RAM), and the like. The microcomputer operates to read a program and data that are stored on the ROM, execute the program, and control the execution of various functions of the ENG-ECU 45 that include a function to acquire various information and a function to control the driving of the internal combustion engine 75.

The ENG-ECU 45 corresponds to a part of the travel control part of the disclosure.

The information acquisition part 71 includes a function to acquire various information including acceleration and deceleration operation information on the amount of accelerator pedal operation that is detected by the accelerator pedal sensor 31 and drive control information that is sent from the brake drive distribution part 57 of the ACC-ECU 41.

The drive controller 73 controls the drive of the internal combustion engine 75 based either on (a) information on accelerating operation (the amount of depression of the accelerator pedal) of the driver that is acquired via the accelerator pedal sensor 31 or (b) drive control information that is sent from the brake drive distribution part 57 of the ACC-ECU 41.

Figure 3:
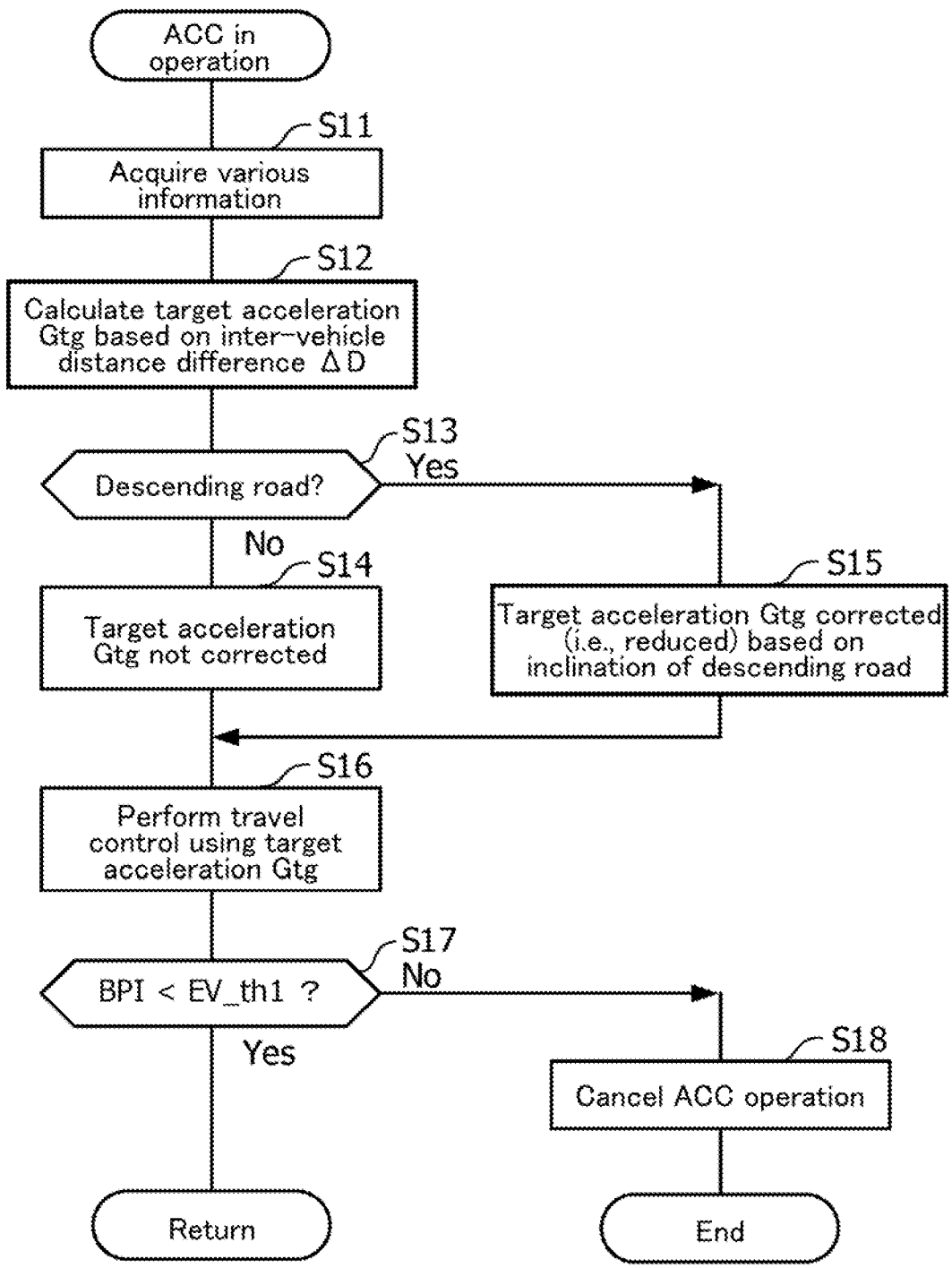
FIG. 3 is a flowchart for explaining the operation of a travel controller according to an embodiment of the disclosure when ACC is in operation.

Operation of Travel Controller 11 According to Embodiment of Disclosure During ACC Operation Next, with reference to FIG. 3, operation of the travel controller 11 according to an embodiment of the disclosure while the ACC is in operation is described below. FIG. 3 is a flowchart for explaining the operation of the travel controller 11 according to an embodiment of the disclosure when the ACC is in operation.

In step S11 of FIG. 3, the information acquisition part 51 of the ACC-ECU 41 acquires information of the pad temperature Tpd0 in order to acquire the braking performance index BPI that changes over time during ACC operation. The ACC-ECU 41 converts the acquired pad temperature Tpd0 to the braking performance index BPI. In this way, the braking performance index BPI based on the pad temperature Tpd is acquired.

Furthermore, the information acquisition part 51 of the ACC-ECU 41 acquires (a) travelling road information on whether the road on which the host vehicle OC travels is a descending road via the camera 23 that captures an image of an area in the direction of travel of the host vehicle OC, and, when the road on which the host vehicle OC travels is a descending road, (b) information on the tilt angle (inclination) via the tilt angle sensor 32.

Yet further, the information acquisition part 51 of the ACC-ECU 41 acquires information on an actual inter-vehicle distance RD with a preceding vehicle via the radar 21 and information on a target inter-vehicle distance TD. Also, the information acquisition part 51 acquires information on the difference ΔD between the target inter-vehicle distance TD and actual inter-vehicle distance RD.

In step S12, the target G calculator 55 of the ACC-ECU 41 calculates a target acceleration Gtg based on the difference ΔD between the target inter-vehicle distance TD and the actual inter-vehicle distance RD for the headway travel control of the ACC.

In step S13, the ACC-ECU 41 determines whether the road on which the host vehicle OC travels is a descending road LRD based on the travelling road information acquired by the information acquisition part 51 of the ACC-ECU 41.

If, as a result of step S13, it is determined that the road on which the host vehicle OC travels is not a descending road LRD (i.e., the road is a flat road FRD; "No" in step S13), the ACC-ECU 41 advances the process of the flowchart to step S14.

If, on the other hand, it is determined, as a result of step S13, that the road on which the host vehicle OC travels is a descending road LRD ("Yes" in step S13), the ACC-ECU 41 advances the process of the flowchart to step S15.

In the case where the road on which the host vehicle OC travels has been determined not to be a descending road LRD (i.e., the road is a flat road FRD) and the process has advanced to step S14, the target G calculator 55 of the ACC-ECU 41 uses the target acceleration Gtg calculated in step S12 without correction as base data for performing travel control.

In the case where the road on which the host vehicle OC travels has been determined to be a descending road LRD and the process has advanced to step S15, the target G calculator 55 of the ACC-ECU 41 corrects the target acceleration Gtg that was calculated in step S12 so that (a) the target acceleration Gtg is reduced based on an inclination of the descending road and (b) the reduction in the target acceleration Gtg becomes greater with greater inclination (i.e., tilt angle) of the descending road. The target G calculator 55 of the ACC-ECU 41 uses the corrected target acceleration Gtg as base data for performing travel control.

In step S16, the ACC-ECU 41 performs travel control using the target acceleration Gtg that has been adopted in either step S14 or S15 as base data.

In step S17, the ACC operation determiner 53 of the ACC-ECU 41 determines whether the braking performance index BPI based on the pad temperature Tpd has declined relative to the first reference threshold EV_th1. Step S17 determines whether the braking performance index BPI based on the pad temperature Tpd is at a level where continued operation of the ACC is possible.

If, as a result of step S17, it is determined that the braking performance index BPI based on the pad temperature Tpd has not declined relative to the first reference threshold EV_th1 ("Yes" in step 17), the ACC-ECU 41 determines that the continued operation of the ACC is possible, and returns to step S11 of the process of the flowchart to go through the subsequent steps.

If, on the other hand, as a result of step S17, it is determined that the braking performance index BPI based on the pad temperature Tpd has declined relative to the first reference threshold EV_th1 ("No" in step 17), the ACC-ECU 41 determines, as a general rule, that the continued operation of the ACC is not possible, and advances to step S18 of the process of the flowchart.

In step S18, the ACC-ECU 41 carries out control concerning the cancelling of ACC operation. Through this step, the operation of the ACC is cancelled. After the cancellation of the ACC operation, the ACC-ECU 41 ends the process shown in the flowchart.

Figure 4A:
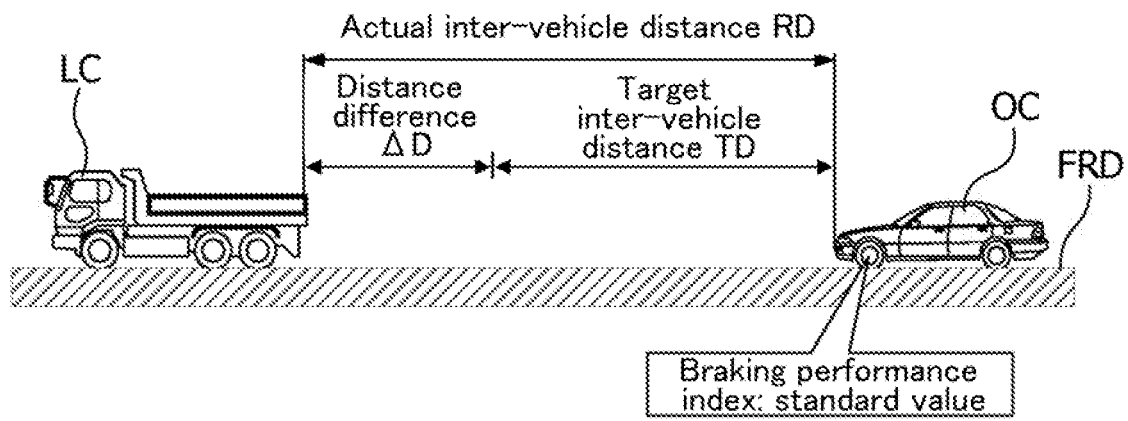
FIGS. 4A and 4B are diagrams for explaining the operation of a travel controller according to a Comparative Example.

Operation of Travel Controller 11 According to Comparative Example During ACC Operation Next, the operation of a travel controller 11 according to a Comparative Example when the ACC is in operation is explained with reference to FIGS. 4A and 4B. FIG. 4A is a diagram for explaining the operation of a travel controller 11 according to a Comparative Example.

FIG. 4A shows a scene where a host vehicle OC with the ACC in operation travels by following a preceding vehicle LC that is travelling on a flat road FRD. In FIG. 4A, an actual inter-vehicle distance RD between the preceding vehicle LC and host vehicle OC, a target inter-vehicle distance TD, and a distance difference ΔD derived by subtracting the target inter-vehicle distance TD from the actual inter-vehicle distance RD are shown.

Furthermore, FIG. 4A shows that the braking performance index BPI of the host vehicle OC has a "standard value". Having the braking performance index BPI of the host vehicle OC at a "standard value" means that the level of the braking performance of the host vehicle OC (the level of likelihood of brake fade occurring) shows a medium value.

Figure 4B:
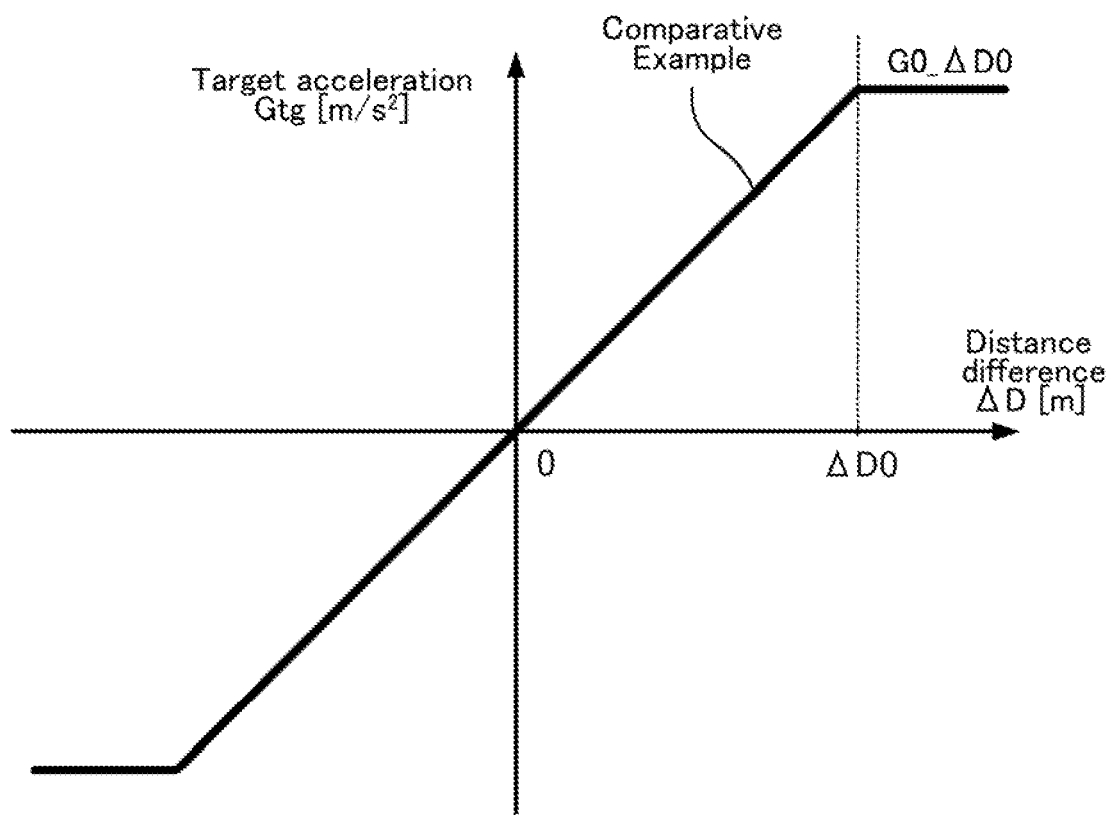

FIG. 4B is a characteristic curve with the distance difference ΔD as the x-axis and the target acceleration Gtg as the y-axis. The characteristic curve of FIG. 4B shows the variation characteristic of the target acceleration Gtg with respect to the distance difference ΔD for the scenario of FIG. 4A where the host vehicle OC follows the preceding vehicle LC. In FIG. 4B, a distance difference ΔD of zero means that the actual inter-vehicle distance RD and target inter-vehicle distance TD are the same. When the distance difference ΔD is zero, since the host vehicle OC does not require the adjusting of speed, the target acceleration Gtg is also zero.

In the first quadrant of the characteristic curve of FIG. 4B, the distance difference ΔD that is depicted by the x-axis range in the direction of the arrow starting from 0 takes a positive value, and the target acceleration Gtg that is depicted by the y-axis in the direction of the arrow starting from 0 takes a positive value. In this first quadrant, the variation characteristic of the target acceleration Gtg shows the target acceleration Gtg to increase linearly in the range between x=0 and x=standard distance difference ΔD0 then to stay at a constant value of G0_ΔD0 when x≥standard distance difference ΔD0. This characteristic is called the variation characteristic of the target acceleration Gtg according to the Comparative Example.

Operation of Travel Controller 11 According to Example 1 During ACC Operation

Figure 5A:
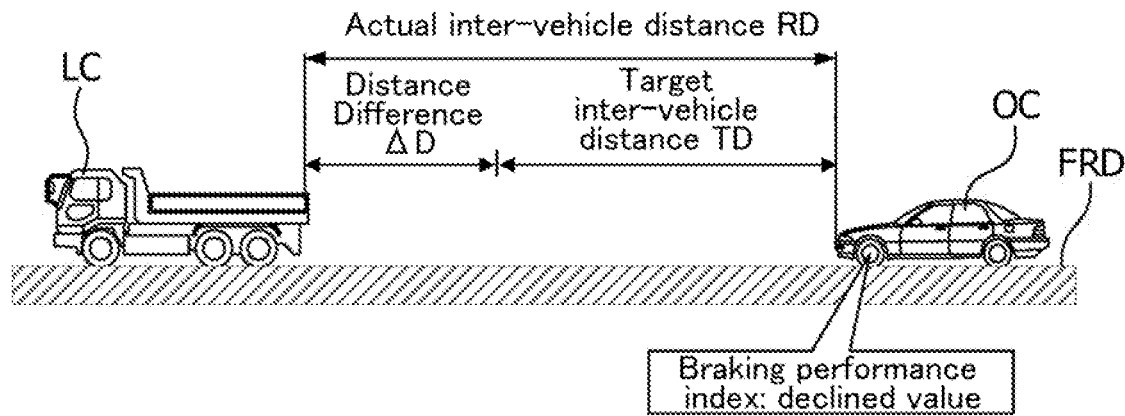
FIGS. 5A and 5B are diagrams for explaining the operation of a travel controller according to Example 1 of the disclosure.
Figure 5B:
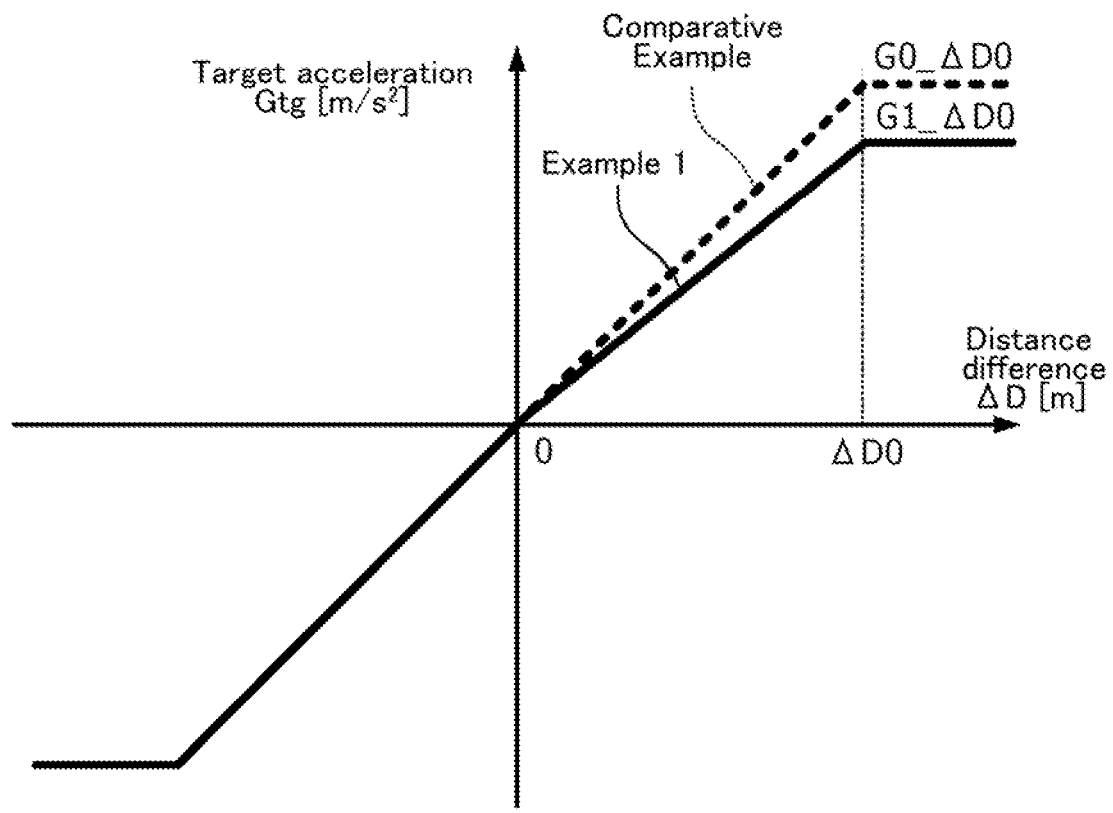

Next, the operation of a travel controller 11 according to Example 1 when the ACC is in operation is explained with reference to FIGS. 5A and 5B. FIGS. 5A and 5B are diagrams for explaining the operation of a travel controller 11 according to Example 1.

The operation of the travel controller 11 according to Example 1 as shown in FIGS. 5A and 5B and the operation of the travel controller 11 according to the Comparative Example as shown in FIGS. 4A and 4B have many parts that are in common.

Focus is thus placed on the differences between the two in describing the operation of the travel controller 11 according to Example 1 while the ACC is in operation.

In the Comparative Example shown in FIG. 4A, the braking performance index BPI of the host vehicle OC has a "standard value". In contrast, in Example 1 shown in FIG. 5A, the braking performance index BPI of the host vehicle OC is shown to have a "declined value". The braking performance index BPI of the host vehicle OC having a "declined value" means that the level of the braking performance of the host vehicle OC (the level of likelihood of brake fade occurring) is at a declined value relative to the "standard value".

Furthermore, in the first quadrant of the characteristic curve of FIG. 5B, the variation characteristic of the target acceleration Gtg according to Example 1 differs from the variation characteristic of the target acceleration Gtg according to the Comparative Example in that the target acceleration Gtg has a reduced valued compared to the Comparative Example when the distance difference ΔD is the same.

More specifically, in the first quadrant of the characteristic curve of FIG. 4B, the variation characteristic of the target acceleration Gtg according to the Comparative Example shows the target acceleration Gtg to increase linearly in the range between x=0 and x=standard distance difference ΔD0 then to stay at a constant value of G0_ΔD0 when x≥standard distance difference ΔD0.

In comparison, in the first quadrant of the characteristic curve of FIG. 5B, the variation characteristic of the target acceleration Gtg according to Example 1 shows the target acceleration Gtg to increase linearly in the range between x=0 and x=standard distance difference ΔD0 with a smaller inclination compared to the Comparative Example, then to stay at a constant value of G1_ΔD0 when x≥standard distance difference ΔD0. Note that G1_ΔD0<G0_ΔD0.

The reduced values of the target acceleration Gtg shown by the variation characteristic of the target acceleration Gtg according to Example 1 in the first quadrant of the characteristic curve of FIG. 5B when compared to the variation characteristic of the target acceleration Gtg according to the Comparative Example is related to the fact that, with the travel controller 11 according to Example 1, the braking performance index BPI of the host vehicle OC takes a "declined value".

In other words, for the travel controller 11 according to Example 1, the braking performance index BPI of the host vehicle OC taking a "declined value" means that the level of likelihood of brake fade occurring is heightened to a level where the adaptive cruise control function of the ACC cannot sufficiently be secured. As it stands, there is a high probability of inviting the prohibition of ACC operation as a result of the value of the braking performance index BPI of the host vehicle OC declining relative the first reference threshold EV_th1.

Therefore, for the purpose of reducing the level of likelihood of brake fade occurring while the ACC is in operation when the braking performance index BPI of the host vehicle OC has a "declined value", the travel controller 11 according to Example 1 is configured in the following way: the variation characteristic of target acceleration Gtg according to Example 1 is such that the value of the target acceleration Gtg is reduced compared to variation characteristic of target acceleration Gtg according to the Comparative Example for a common distance difference ΔD.

Operation of Travel Controller 11 According to Example 1 When Headway Travel Control is in Operation In other words, for the headway travel control, when an actual inter-vehicle distance RD becomes wider than the target inter-vehicle distance TD, the travel controller 11 according to Example 1 is configured to calculate the target acceleration Gtg based on a difference ΔD between the target inter-vehicle distance TD and the actual inter-vehicle distance RD. And when the target acceleration Gtg is calculated, if a braking performance index BPI based on brake state information (a pad temperature Tpd0) acquired with the information acquisition part 51 has declined relative to a predetermined evaluation threshold EV_th while the headway travel control is in operation, then the target acceleration Gtg is corrected so that the target acceleration Gtg is reduced compared to if the braking performance index BPI has not declined relative to the evaluation threshold EV_th, and the headway travel control is performed so that the actual inter-vehicle distance RD is brought closer to the target inter-vehicle distance TD based on the corrected target acceleration Gtg.

Note that, with regards to the travel controller 11 according to Example 1, cases where the braking performance index BPI has declined relative to the evaluation threshold EV_th corresponds, for example, to when the braking performance index BPI of the host vehicle OC has a "declined value" compared to the "standard value".

Note also that, cases where the braking performance index BPI has not declined relative to the evaluation threshold EV_th corresponds, for example, to when the braking performance index BPI of the host vehicle OC has a "standard value".

As shown in FIG. 5B, for the travel controller 11 according to Example 1, when the braking performance index BPI of the host vehicle OC has a "declined value", the target acceleration Gtg according to Example 1 has a reduced value compared to the target acceleration Gtg of the Comparative Example when values of the target acceleration Gtg are compared for a common distance difference ΔD. For this reason, with the travel controller 11 according to Example 1, the acceleration motion to close the distance difference ΔD is more restrained compared to the travel controller 11 according to the Comparative Example.

Therefore, compared to the travel controller 11 according to the Comparative Example, with the travel controller 11 according to Example 1, it is possible to reduce the level of likelihood of brake fade occurring while the ACC (headway travel control) is in operation. As a result, it is possible for the operation time of the ACC to be extended as much as possible and for the travel controller 11 of Example 1 to contribute to improving the operation rate of the ACC.

Operation of Travel Controller 11 According to Variation of Example 1 When Constant Speed Travel Control is in Operation Furthermore, a travel controller 11 according to a Variation of Example 1 is configured so that, for the constant speed travel control in which the host vehicle OC is controlled to travel at constant speed in accordance with a target vehicle speed SV, when an actual speed RV drops below the target speed SV, the travel controller 11 calculates target acceleration Gtg based on a difference DV between the target vehicle speed SV and the actual vehicle speed RV. And when the target acceleration Gtg is calculated, if a braking performance index BPI based on brake state information (a pad temperature Tpd0) acquired with the information acquisition part 51 has declined relative to a predetermined evaluation threshold EV_th while the constant speed travel control has been in operation, then the target acceleration Gtg is corrected so that the target acceleration Gtg is reduced compared to if the braking performance index BPI has not declined relative to the evaluation threshold EV_th and the constant speed travel control is performed so that the actual vehicle speed RV is brought closer to the target vehicle speed SV based on the corrected target acceleration Gtg.

Note that, with regards to the travel controller 11 according to the Variation of Example 1, cases where the braking performance index BPI has declined relative to the evaluation threshold EV_th corresponds to, for example, when the braking performance index BPI of the host vehicle OC has a "declined value" compared to the "standard value", in the same way as with the travel controller 11 according to Example 1.

Note also that, cases where the braking performance index BPI has not declined relative to the evaluation threshold EV_th corresponds, for example, to when the braking performance index BPI of the host vehicle OC has a "standard value", in the same way as with the travel controller 11 according to Example 1.

As shown in FIG. 5B, with the travel controller 11 according to the Variation of Example 1, when the braking performance index BPI of the host vehicle OC has a "declined value", the target acceleration Gtg has a reduced value compared to the target acceleration Gtg of the Comparative Example when values of the target acceleration Gtg are compared for a common distance difference ΔD. Therefore, in the same way as with the travel controller 11 according to Example 1, with the travel controller 11 according to the Variation of Example 1, the acceleration motion to close the distance difference ΔD is more restrained in comparison to the travel controller 11 according to the Comparative Example.

Therefore, with the travel controller 11 according to the Variation of Example 1, it is possible to reduce the level of likelihood of brake fade occurring while the ACC (constant speed travel control) is in operation in comparison to the travel controller 11 according to the Comparative Example. As a result, it is possible for the operation time of the ACC to be extended as much as possible and for the travel controller 11 of the Variation of Example 1 to contribute to improving the operation rate of the ACC.

Operation of Travel Controller 11 According to Example 2 During ACC Operation

Figure 6A:
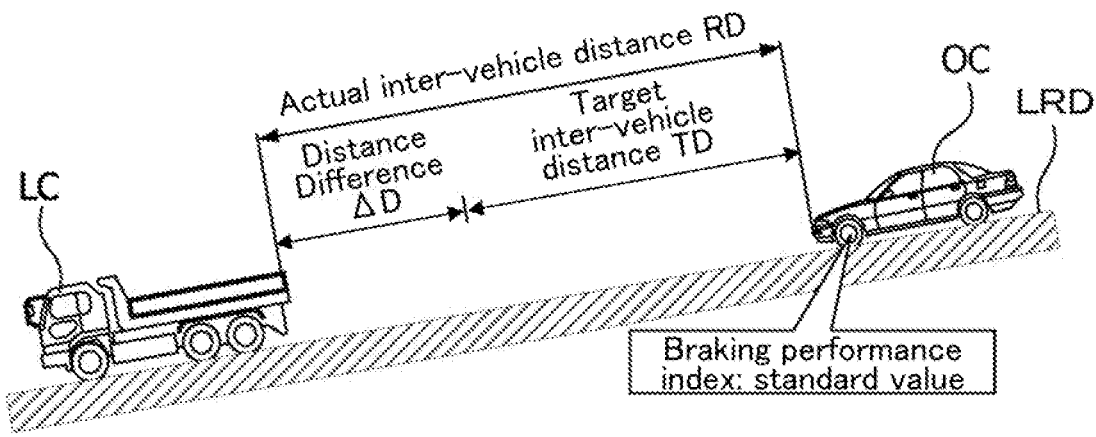
FIGS. 6A and 6B are diagrams for explaining the operation of a travel controller according to Example 2 of the disclosure.
Figure 6B:
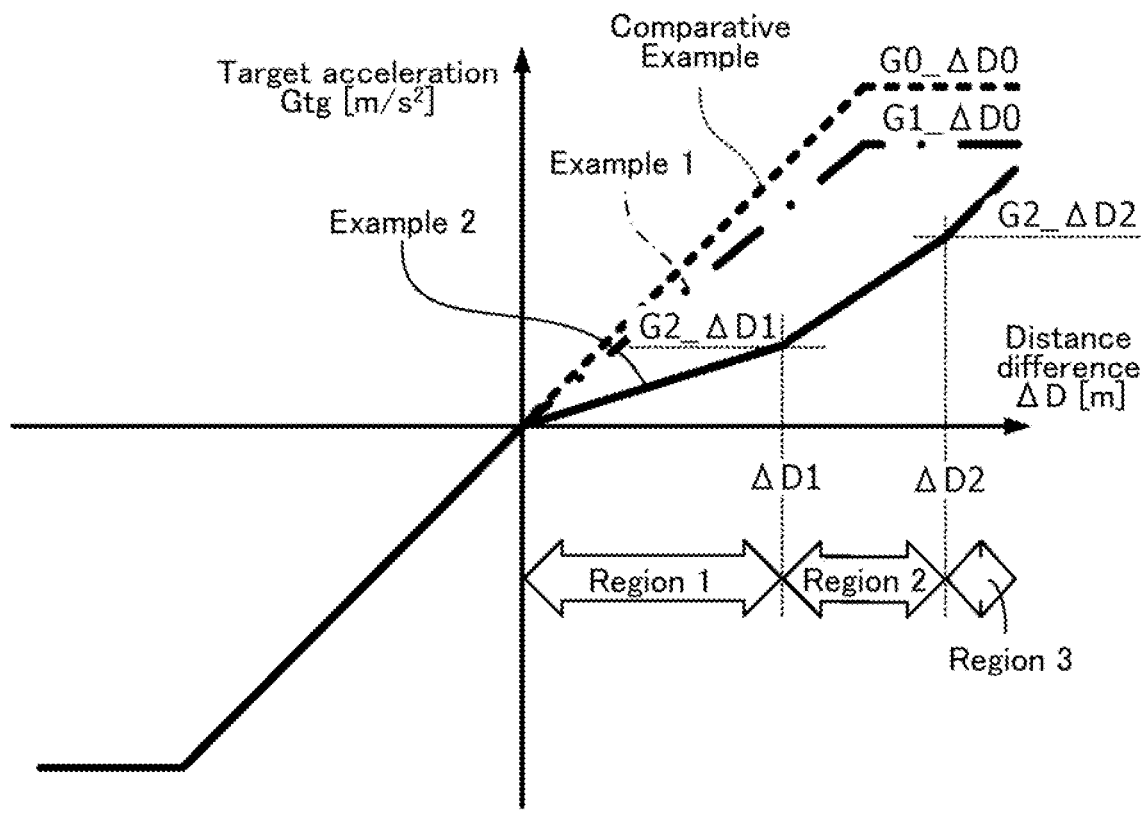

Next, the operation of a travel controller 11 according to Example 2 when the ACC is in operation is described with reference to FIGS. 6A and 6B. FIGS. 6A and 6B are diagrams for explaining the operation of a travel controller 11 according to Example 2.

The operation of the travel controller 11 according to Example 2 as shown in FIGS. 6A and 6B and the operation of the travel controller 11 according to the Comparative Example as shown in FIGS. 4A and 4B have many parts that are in common.

Focus is thus placed on the differences between the two in describing the operation of the travel controller 11 according to Example 2 while the ACC is in operation.

In the Comparative Example shown in FIG. 4A, a scene is depicted where a host vehicle OC with the ACC in operation travels by following a preceding vehicle LC that is travelling on a flat road FRD. Example 2 shown in FIG. 6A, on the other hand, shows a scene where a host vehicle OC with the ACC in operation travels by following a preceding vehicle LC that is travelling on a descending road LRD.

Example 2 differs from the Comparative Example in that a descending road LRD is adopted for the road on which the host vehicle OC travels in Example 2 whereas a flat road FRD is adopted in the Comparative Example.

Furthermore, in the first quadrant of FIG. 4B, the variation characteristic of the target acceleration Gtg shows the target acceleration Gtg to increase linearly in the range between x=0 and x=standard distance difference ΔD0 and then to stay at a constant value of G0_ΔD0 when x≥standard distance difference ΔD0.

In comparison, in the first quadrant of the characteristic curve of FIG. 6B, the variation characteristic of the target acceleration Gtg shows the target acceleration Gtg to increase linearly in region 1, the range between x=0 and x=first distance difference ΔD1, and to increase linearly again in region 2, the range between x=first distance difference ΔD1 and x=second distance difference ΔD2, and to increase linearly again in region 3, the range where x≥second distance difference ΔD2.

Furthermore, as shown in FIG. 6B, the value of the target acceleration Gtg is G2_ΔD1 when the distance difference ΔD is equal to the first distance difference ΔD1, and the value of the target acceleration Gtg is G2_ΔD2 when the distance difference ΔD is equal to the second distance difference ΔD2. The following relationship holds for the values of the target acceleration Gtg G2_ΔD1<G2_ΔD2<G0_ΔD0.

There are three notable points regarding the variation characteristic of the target acceleration Gtg according to Example 2.

The first point is that, as shown in FIG. 6B, the variation characteristic of the target acceleration Gtg according to Example 2 is such that the value of the target acceleration Gtg according to Example 2 has a reduced value compared to the target acceleration Gtg according to the Comparative Example for a common distance difference ΔD.

The second point is that, as shown in FIG. 5B and FIG. 6B, the variation characteristic of the target acceleration Gtg according to Example 2 is such that the value of the target acceleration Gtg according to Example 2 has a reduced value compared to the target acceleration Gtg according to the variation characteristic of Example 1 (including the Variation of Example 1; hereafter the same) for a common distance difference ΔD.

The third point is as follows. As is shown in FIG. 6B, when the variation characteristic of the target acceleration Gtg according to Example 2 in region 1, region 2, and region 3 are compared, the degree of reduction in the target acceleration Gtg becomes less severe with the ascending order of the three regions. In other words, when the gradient of the variation characteristic in region 1, region 2, and region 3 are compared, the gradient increases with the ascending order of the three regions.

The first point regarding the variation characteristic of the target acceleration Gtg according to Example 2 is associated with the fact that the road on which the host vehicle OC travels is a descending road LRD. When the road on which the host vehicle OC travels is a descending road LRD, because the braking load is greater compared to when the road on which the host vehicle OC travels is a flat road FRD, there is a tendency for the level of likelihood of brake fade occurring to rise. If this tendency is neglected, it is highly probable for the ACC operation to be prohibited as a result of the value of the braking performance index BPI of the host vehicle OC declining beyond the first reference threshold EV_th1.

Thus, for the purpose of reducing the level of likelihood of brake fade occurring when the ACC is in operation, the travel controller 11 according to Example 2 is configured in the following way: if the information acquisition part 51 acquires travelling road information that the road on which the host vehicle OC travels is a descending road LRD, when the target acceleration Gtg is calculated, correction is made to reduce the target acceleration Gtg to a lower value compared to when the road on which the host vehicle OC travels is not a descending road LRD (for example, a flat road FRD), and travel control is performed so that either the actual vehicle speed RV is brought closer to the target vehicle speed SV based on the corrected target acceleration Gtg or the actual inter-vehicle distance RD is brought closer to the target inter-vehicle distance TD based on the corrected target acceleration Gtg.

With the travel controller 11 according to Example 2, if the information acquisition part 51 acquires traveling road information that the road on which the host vehicle OC travels is a descending road LRD, when calculating the target acceleration Gtg, the target acceleration Gtg is reduced compared to when the road on which the host vehicle OC travels is not a descending road LRD (for example, a flat road FRD). For this reason, with the travel controller 11 of Example 2, the acceleration motion for closing the distance difference ΔD is more restrained compared to the travel controller 11 of the Comparison Example.

Therefore, compared to the travel controller 11 according to the Comparison Example, the travel controller 11 according to Example 2 is possible to reduce the level of likelihood of brake fade occurring while the ACC is in operation. As a result, it is possible for the operation time of the ACC to be extended as much as possible and for the travel controller 11 according to Example 2 to contribute to improving the operation rate of the ACC.

Furthermore, when the variation characteristic of the target acceleration Gtg according to Example 2 (refer to the plot represented by a solid line in FIG. 6B) is compared with the variation characteristic of the target acceleration Gtg according to Example 1 (refer to the plot represented by a dot-dashed line in FIG. 6B), as shown in FIG. 6B, the value of the target acceleration Gtg according to Example 2 has a reduced value compared to the target acceleration Gtg according to Example 1 for a common distance difference ΔD. For this reason, with the travel controller 11 according to Example 2, the acceleration motion for closing the distance difference ΔD is more restrained compared to the travel controller 11 according to Example 1.

Therefore, compared to the travel controller 11 of Example 1, the travel controller 11 of Example 2 is possible to reduce the level of likelihood of brake fade occurring while the ACC (travel control) is in operation. As a result, the operating time of the ACC is prolonged as much as possible and the travel controller 11 of Example 2 can contribute to improving the operation rate of ACC.

Furthermore, when the variation characteristic of the target acceleration Gtg according to Example 2 in region 1, region 2, and region 3 are compared, as shown in FIG. 6B, the degree of reduction of the target acceleration Gtg becomes less severe with the ascending order of the three regions. For this reason, with the travel controller 11 according to Example 2, the acceleration motion for closing the distance difference ΔD becomes more rapid with greater distance difference ΔD.

Therefore, according to the travel controller 11 of Example 2, because the acceleration motion for closing the distance difference ΔD gradually becomes steeper with the increase in the distance difference ΔD, the closing of the distance difference ΔD may be carried out efficiently.

Figure 7A:
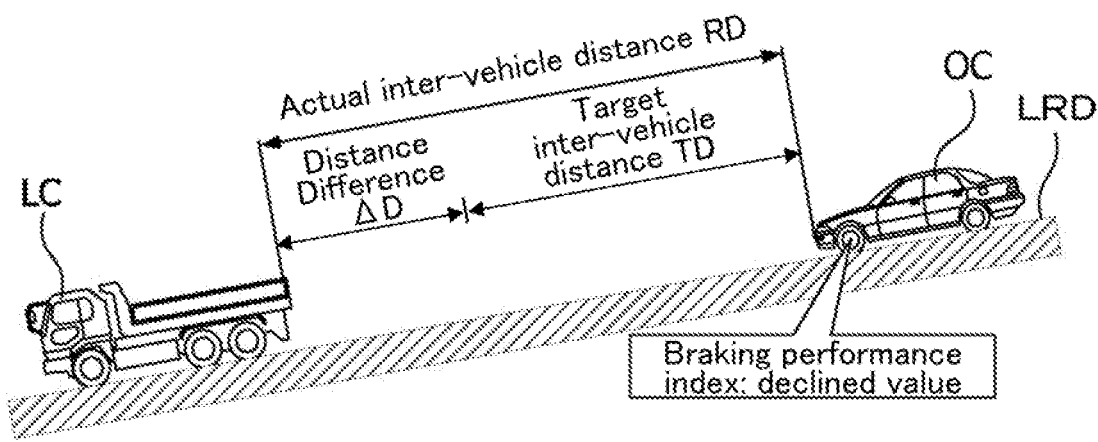
FIGS. 7A and 7B are diagrams for explaining the operation of a travel controller according to Example 3 of the disclosure.
Figure 7B:
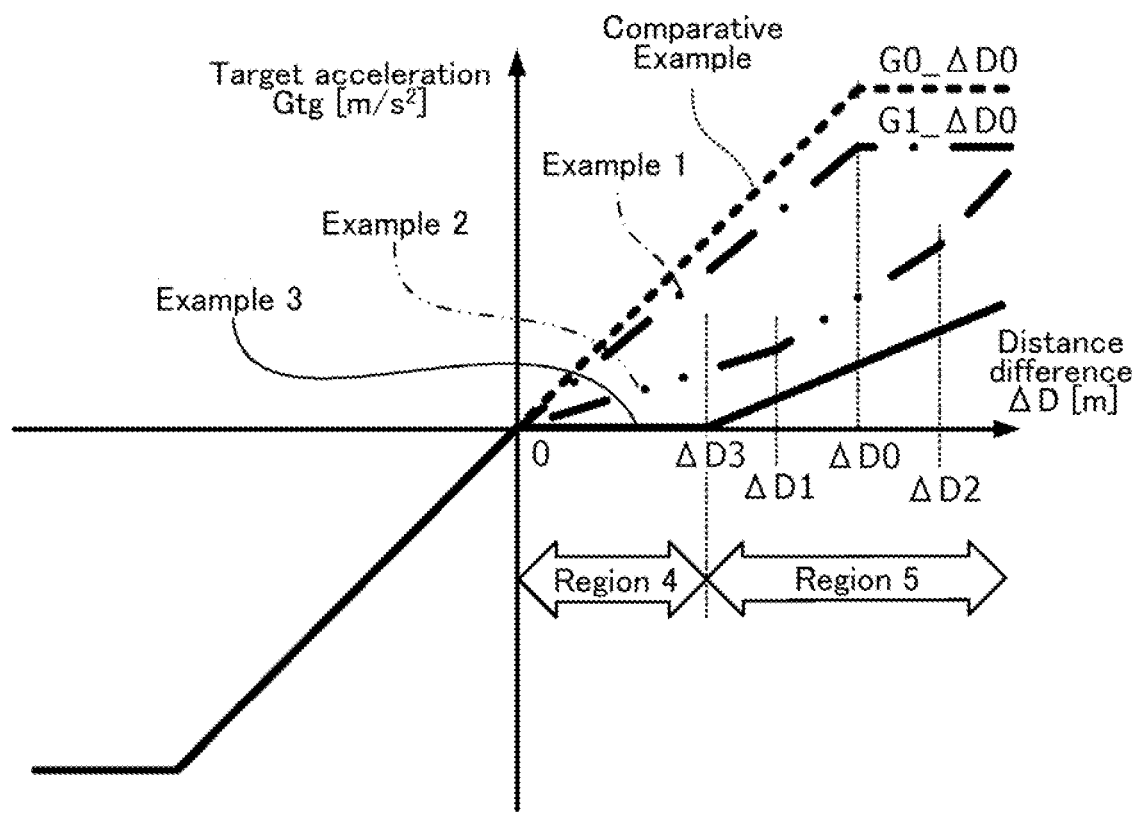

Operation of Travel Controller 11 According to Example 3 During ACC Operation Next, the operation of a travel controller 11 according to Example 3 when the ACC is in operation is explained with reference to FIGS. 7A and 7B. FIGS. 7A and 7B are diagrams for explaining the operation of a travel controller 11 according to Example 3.

The travel controller 11 according to Example 3 shown in FIGS. 7A and 7B is a combined form of the travel controller 11 according to Example 1 (see FIGS. 5A and 5B) and the travel controller 11 according to Example 2 (see FIGS. 6A and 6B). Due to this, there are many commonalities between the operation of the travel controller 11 according to Example 3 and operation of the travel controller 11 of Example 1 and Example 2.

Focus is thus placed on the commonalities and differences between the two above-mentioned sets of travel controllers 11 in describing the operation of the travel controller 11 according to Example 3 while the ACC is in operation.

In Example 1 shown in FIG. 5A, the braking performance index BPI of the host vehicle OC is shown to be at a "declined value" (i.e., a value that is lower than the "standard value" of the braking performance index BPI). Similarly, in Example 3 shown in FIG. 7A, the braking performance index BPI of the host vehicle OC is shown to be at a "declined value".

Furthermore, in Example 2 shown in FIG. 6A, a descending road LRD is adopted as the road on which the host vehicle OC travels. Similarly, Example 3 shown in FIG. 7A adopts a descending road LRD as the road on which the host vehicle OC travels.

The characteristic curve shown in FIG. 7B shows a variation characteristic of the target acceleration Gtg (refer to the plot represented by a solid line in FIG. 7B) corresponding to Example 3 shown in FIG. 7A. Also in FIG. 7B are shown the variation characteristics of the target acceleration Gtg according to Comparison Example (refer to the plot represented by a dotted line in FIG. 7B), Example 1 (refer to the plot represented by a dot-dashed line in FIG. 7B), and Example 2 (refer to the plot represented by a dot-dot-dashed line in FIG. 7B).

In the first quadrant of the characteristic curve of FIG. 7B, the variation characteristic of target acceleration Gtg according to Example 3 differs from the variation characteristic of target acceleration Gtg according to Comparative Example, Example 1, and Example 2 in that the target acceleration Gtg has a reduced value compared to the Comparative Example, Example 1, and Example 2 for a common distance difference ΔD.

More specifically, in the first quadrant of the characteristic curve shown in FIG. 7B, the variation characteristic of the target acceleration Gtg according to Example 3 shows a characteristic where the value of the target acceleration Gtg remains constant (Gtg=0) in region 4 (0≤x≤third distance difference ΔD3) but grows linearly in region 5 (x≥third distance difference ΔD3).

The reduction in the target acceleration Gtg shown by the variation characteristic of the target acceleration Gtg according to Example 3 in comparison to the variation characteristics of the target acceleration Gtg according to the Comparative Example, Example 1, and Example 2 in the first quadrant of the characteristic curve of FIG. 7B is related to the fact that, with the travel controller 11 according to Example 3, the braking performance index BPI of the host vehicle OC has a "declined value" and the road on which the host vehicle OC travels is a "descending road LRD".

In other words, for the travel controller 11 according to Example 3, the fact that the braking performance index BPI of the host vehicle OC has a "declined value" means that the level of likelihood of brake fade occurring is heightened to a level where the adaptive cruise control function of the ACC cannot sufficiently be secured. As it stands, there is a high probability of inviting the prohibition of ACC operation as a result of the value of the braking performance index BPI of the host vehicle OC declining relative the first reference threshold EV_th1.

Moreover, in the case where the road on which the host vehicle OC travels is a "descending road LRD", braking load becomes greater compared to the case where the road on which the host vehicle OC travels is a "flat road FRD", meaning that there is a tendency for the level of likelihood of brake fade occurring to rise. If this tendency is neglected, it is highly probable that the ACC operation will be prohibited as a result of the braking performance index BPI of the host vehicle OC declining beyond the first reference threshold EV_th1.

Therefore, for the purpose of reducing the level of likelihood of brake fade occurring while the ACC is in operation, the travel controller 11 according to Example 3 is configured in the following way: the variation characteristic of the target acceleration Gtg according to Example 3 has a reduced value of the target acceleration Gtg compared to the variation characteristics of target acceleration Gtg according to the Comparative Example, Example 1, and Example 2 for a common distance difference ΔD.

As shown in FIG. 7B, with the travel controller 11 according to Example 3, the target acceleration Gtg according to Example 3 takes a reduced value compared to the target acceleration Gtg of the Comparative Example, Example 1, and Example 2 when values of the target acceleration Gtg are compared for a common distance difference ΔD. For this reason, with the travel controller 11 according to Example 3, the acceleration motion to close the distance difference ΔD is more restrained in comparison to the travel controllers 11 according to the Comparative Example, Example 1, and Example 2.

Therefore, compared to the travel controllers 11 according to the Comparison Example, Example 1, and Example 2, the travel controller 11 according to Example 3 is possible to further reduce the level of likelihood of brake fade occurring while the ACC (travel control) is in operation. As a result, it is possible for the operation time of the ACC to be extended as much as possible and for the travel controller 11 of Example 3 to contribute to improving the operation rate of the ACC.

Correction of Target Acceleration Gtg Based on Coefficient Scale CS

Next, correction of the target acceleration Gtg based on a coefficient scale CS is described with reference to FIGS. 8A-8C and by using examples applied to the previously described Examples 1-3 as well to Example 4 that is described later.

Figure 8A:
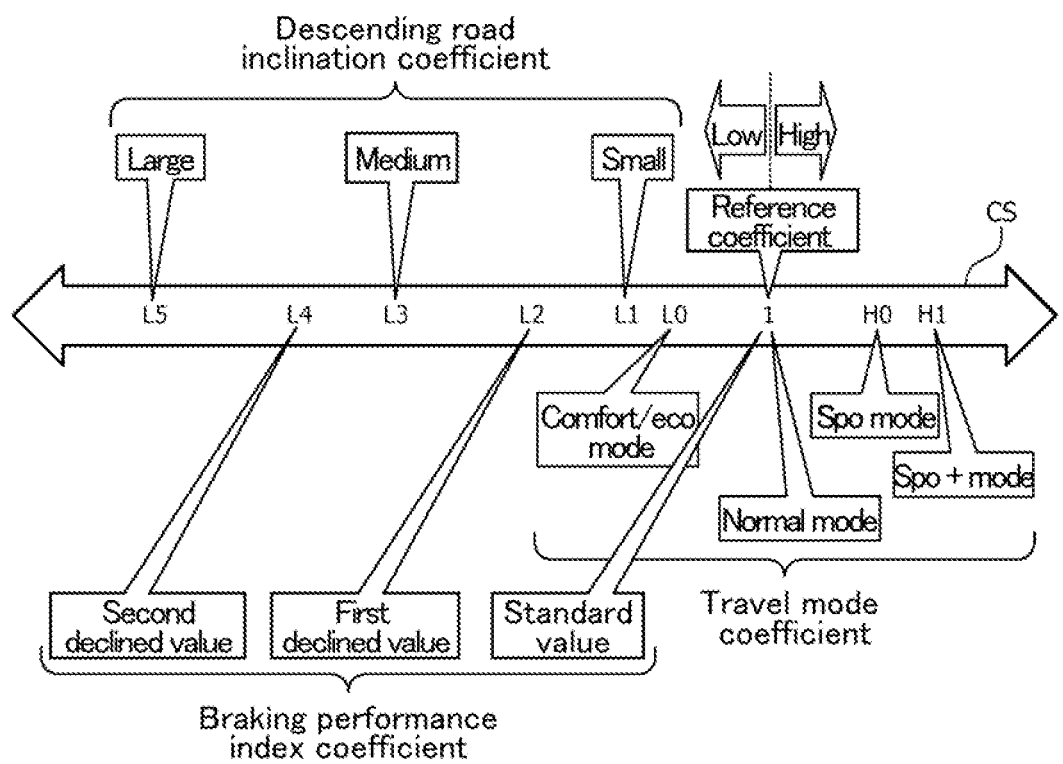
FIG. 8A is a diagram for explaining a procedure to correct target acceleration based on coefficient scales applied to Examples 1-4.

FIG. 8A is a diagram for explaining a procedure to correct the target acceleration Gtg based on coefficient scales CS applied to Examples 1-4. FIG. 8B is a diagram for explaining a procedure to correct the target acceleration Gtg based on a coefficient scale CS applied to Example 1. FIG. 8C is a diagram for explaining a procedure to correct the target acceleration Gtg based on a coefficient scale CS applied to Example 2.

Correction of Target Acceleration Gtg Based on Coefficient Scale CS Applied to Example 1

First, correction of the target acceleration Gtg based on a coefficient scale CS applied to the travel controller 11 according to Example 1 is explained with reference to FIGS. 8A and 8B.

For the purpose of reducing the level of likelihood of brake fade occurring while the ACC is in operation when the braking performance index BPI of the host vehicle OC takes a "declined value", the travel controller 11 according to Example 1 is configured in the following way: the variation characteristic of the target acceleration Gtg according to Example 1 has, as shown in FIG. 5B, a reduced value of the target acceleration Gtg compared to the variation characteristic of the target acceleration Gtg according to the Comparative Example for a common distance difference ΔD.

Figure 8B:
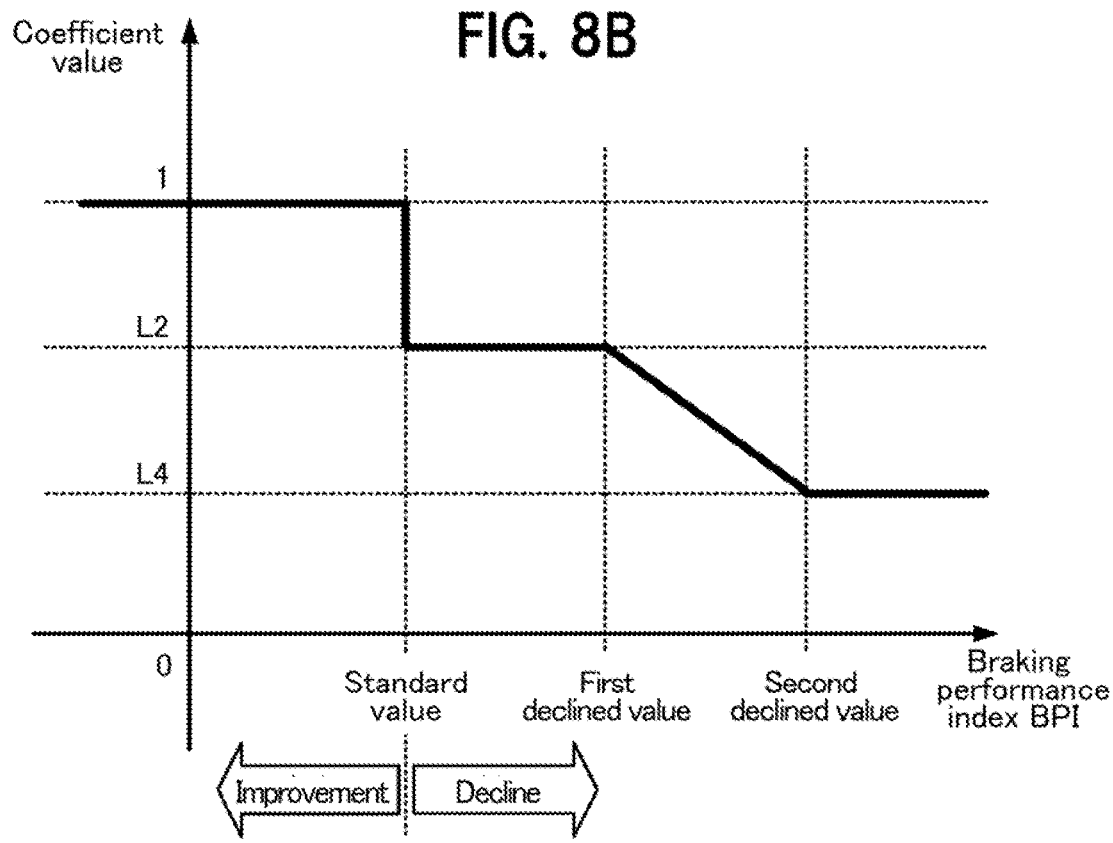
FIG. 8B is a diagram for explaining a procedure to correct the target acceleration based on a coefficient scale applied to Example 1.

The type of coefficient scale CS that is applied to the travel controller 11 according to Example 1 is a braking performance index coefficient as shown in FIGS. 8A and 8B. The braking performance index coefficient is a correction coefficient that is set to appropriately carry out correction of the target acceleration Gtg in accordance with the level of braking performance index BPI of the host vehicle OC. In an example shown in FIGS. 8A and 8B, values of the braking performance index coefficient for a "standard value", "first declined value", and "second declined value" are set to 1, L2, and L4 (such that L4<L2) respectively with the coefficient values becoming smaller in the given order.

A procedure to correct the target acceleration Gtg based on a coefficient scale CS (the braking performance index coefficient) that is applied to the travel controller 11 of Example 1 is as follows.

First, a value of the target acceleration Gtg that is used as a base value is calculated using an existing method such as referencing a characteristic curve depicting a variation characteristic of the target acceleration Gtg in relation to the distance difference ΔD.

The calculated value of the target acceleration Gtg that forms the base value is then multiplied by a value of the braking performance index coefficient that is based on the pad temperature Tpd0, for example, L4 (corresponding to the "second declined value"), so that a multiplication result (Gtg×L4 for the given example) is obtained. Through this procedure, a corrected value of the target acceleration Gtg is acquired, wherein the correction is made in terms of the braking performance index coefficient.

Correction of Target Acceleration Gtg Based on Coefficient Scale CS Applied to Example 2

Next, correction of the target acceleration Gtg based on a coefficient scale CS applied to the travel controller 11 according to Example 2 is explained with reference to FIGS. 8A and 8C.

For the purpose of reducing the level of likelihood of brake fade occurring while the ACC is in operation when the road on which the host vehicle OC travels is a descending road LRD, the travel controller 11 according to Example 2 is configured in the following way: if the information acquisition part 51 acquires travelling road information that the road on which the host vehicle OC travels is a descending road LRD, when the target acceleration Gtg is calculated, correction is made to reduce the target acceleration Gtg to a lower value compared to if the road on which the host vehicle OC travels is not a descending road LRD (for example, a flat road FRD), and travel control is performed so that the actual vehicle speed RV is brought closer to the target vehicle speed SV based on the corrected target acceleration Gtg or the actual inter-vehicle distance RD is brought closer to the target inter-vehicle distance TD based on the corrected target acceleration Gtg.

Figure 8C:
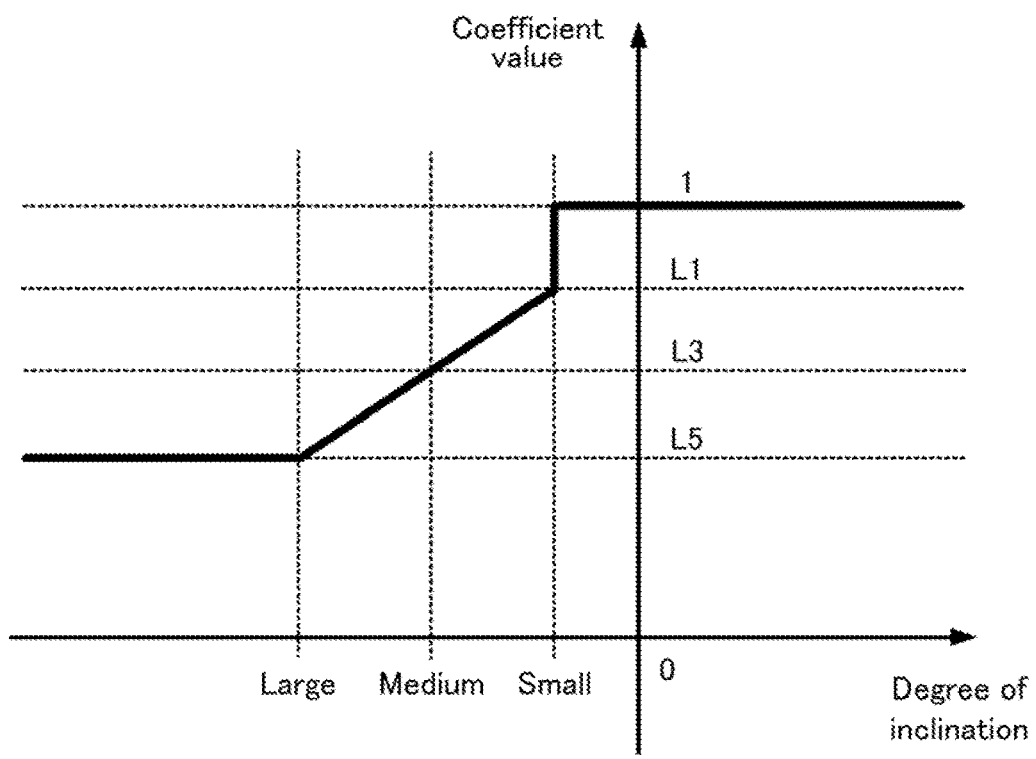
FIG. 8C is a diagram for explaining a procedure to correct the target acceleration based on a coefficient scale applied to Example 2.

The type of coefficient scale CS that is applied to the travel controller 11 according to Example 2 is a descending road inclination coefficient as shown in FIGS. 8A and 8C. The descending road inclination coefficient is a correction coefficient that is set to appropriately carry out correction of the target acceleration Gtg in accordance with the degree of inclination (the tilt angle) when the road on which the host vehicle OC travels is a descending road LRD. In the example shown in FIGS. 8A and 8C, values of the descending road inclination coefficient for a "small inclination", "medium inclination", and "large inclination" are set to L1, L3, and L5 respectively so that the coefficient values become smaller in the given order (i.e., L1>L3>L5).

A procedure to correct the target acceleration Gtg based on a coefficient scale CS (the descending road inclination coefficient) that is applied to the travel controller 11 according to Example 2 is as follows.

First, a value of the target acceleration Gtg that is used as a base value is calculated using an existing method such as referencing a characteristic curve depicting a variation characteristic of the target acceleration Gtg in relation to the distance difference ΔD.

The calculated value of target acceleration Gtg that forms the base value is then multiplied by a value of the descending road inclination coefficient that is acquired by the tilt angle sensor 32, for example L3 (corresponding to the "medium inclination"), so that a multiplication result (Gtg× L3 for the given example) is obtained. Through this procedure, a corrected value of the target acceleration Gtg is acquired, wherein the correction is made in terms of the descending road inclination coefficient.

Correction of the target acceleration Gtg based on a coefficient scale CS that is applied to Example 3 may be achieved as necessary by combining the correction of the target acceleration Gtg based on the coefficient scale CS applied to example 1 and the correction of the target acceleration Gtg based on the coefficient scale CS that is applied to Example 2. For this reason, an explanation for the correction of the target acceleration Gtg based on a coefficient scale CS that is applied to Example 3 will be omitted.

Operation of Travel Controller 11 According to Example 4 During ACC Operation

Next, the operation of a travel controller 11 according to Example 4 when the ACC is in operation is explained with reference to FIG. 8A.

The travel controller 11 according to Example 4 further includes a travel mode switch 36 (a travel mode setting part) that is operated when a travel mode is selected and input (i.e., a travel mode is set) from multiple travel modes that the host vehicle OC is equipped with. The travel controller 11 according to Example 4 makes a correction so that the value of the target acceleration Gtg that becomes the base value is adjusted based on the type of travel mode that has been set with the travel mode switch 36 (a travel mode setting part).

Examples of travel modes from which a setting may be chosen with the travel mode switch 36 include a comfort/eco mode (Comfort/Eco), normal mode (Normal), sports mode (Spo), and sports plus mode (Spo+).

The normal mode (Normal) is a standard travel mode of the multiple travel modes. The comfort/eco mode (Comfort/Eco) is either a travel mode with a drive power characteristic that is more restrained compared to the normal mode (Normal) or a travel mode where emphasis is placed on a fuel consumption characteristic. The sports mode (Spo) and sports plus mode (Spo+) are travel modes with improved drive power characteristics over the normal mode (Normal). The sport plus mode (Spo+) provides an even higher drive power characteristic over the sports mode (Spo).

Travel mode coefficient values are set as shown in FIG. 8A for the four travel modes. The normal mode (Normal) is set a reference coefficient value of 1. The coefficient values of the travels modes are set as follows: L0 for the comfort/eco mode (Comfort/Eco) such that L0<1; 1 for the normal mode (Normal); H0 for the sports mode (Spo) such that H0>1; H1 for the sports plus mode (Spo+) such that H1>H0. In other words, the travels mode coefficient values are set so that the coefficient values become larger in the above order and suitably represent the individual travel modes.

A procedure to correct the target acceleration Gtg based on a coefficient scale CS (the travel mode coefficient) that is applied to the travel controller 11 of Example 4 is as follows.

First, a value of the target acceleration Gtg that is used as a base value is calculated using an existing method such as referencing a characteristic curve depicting a variation characteristic of the target acceleration Gtg in relation to the distance difference ΔD.

The calculated value of the target acceleration Gtg that forms the base value is then multiplied by a travel mode coefficient value that has been set with the travel mode switch 36 (the travel mode setting part), for example H0 (corresponding to the sports mode [Spo]), so that a multiplication result (Gtg×H0 for the given example) is obtained. Through this procedure, a corrected value of the target acceleration Gtg is acquired, wherein the correction is made in terms of the travel mode coefficient.

Operation of Travel Controller 11 According to Combination of Examples 1-4 During ACC Operation Next, an operation of a travel controller 11 according to a combination of Examples 1-4 when the ACC is in operation is explained with reference to FIG. 8A.

Consider a case where, for the travel controller 11 according to a combination of Examples 1-4, the following is true: the value of the braking performance index BPI based on the pad temperature Tpd0 takes a "second declined value" whose corresponding coefficient value is L4 (note that 1>L1>L2>L3>L4>L5); the inclination of a descending road acquired with the tilt angle sensor 32 is a "medium inclination" whose corresponding coefficient value is L3; the travel mode has been set with the travel mode switch 36 (the travel mode setting part) to a sports mode (Spo) whose corresponding coefficient value is H0.

In the abovementioned case, a procedure to correct the target acceleration Gtg based on the coefficient scales CS is as follows.

First, a value of the target acceleration Gtg that is used as a base value is calculated using an existing method such as referencing a characteristic curve depicting a variation characteristic of the target acceleration Gtg in relation to the distance difference ΔD.

The calculated value of the target acceleration Gtg that forms the base value is then multiplied by (a) L4, a value corresponding to a braking performance index BPI based on the pad temperature Tpd0 of the "second declined value"; (b) L3, a value corresponding to a descending road inclination acquired with the tilt angle sensor 32 of the "medium inclination"; and (c) H0, a value corresponding to the sports mode (Spo) set with the travel mode switch 36 (travel mode setting part). A result of the multiplication, (Gtg×L4×L3×H0), is thus obtained. Through this procedure, a corrected value of the target acceleration Gtg (the result of the multiplication) is acquired, wherein the correction is made in terms of the braking performance index coefficient, descending road inclination coefficient, and travel mode coefficient.

Other Embodiments

The embodiments described hereinbefore are examples for realizing the disclosure. Thus, these embodiments should not be used for limiting the technical scope of the disclosure. The disclosure can be carried out in various aspects within a scope not departing from the gist or the major features of the disclosure.

In the description of the travel controller 11 according to Example 2 of the disclosure, an example has been used where the road on which the host vehicle OC travels is a flat road FRD for describing a case where the road on which the host vehicle OC travels is either a flat road FRD or an ascending road. However, the disclosure is not limited to the above example. Cases where the road on which the host vehicle OC travels is either a flat road FRD or an ascending road include a case where the host vehicle OC travels on an ascending road.

In the description of a travel controller 11 according to an embodiment of the disclosure, the ACC-ECU 41 (a travel control part) includes a function to perform either constant speed travel control or headway travel control or both constant speed travel control and headway travel control, wherein the constant speed travel control is configured to control the host vehicle OC to travel at constant speed based on a preset vehicle speed V, and the headway travel control is configured to control the host vehicle OC to travel by following another vehicle travelling ahead so that a predetermined inter-vehicle distance is maintained with the other vehicle.

Therefore, the travel controller according to the disclosure captures all of the following three cases within the technical scope thereof: a case where constant speed travel control is performed and not headway travel control; a case where headway travel control is performed and not constant speed control; and a case where a combination of constant speed travel control and headway travel control is performed.

Furthermore, although the travel controller 11 according to embodiments of the disclosure has been described using examples where a vehicle is installed with an internal combustion engine 75 as a drive means, the disclosure is not limited to these examples. The disclosure is applicable to vehicles installed with a compression-ignition engine (a diesel engine) as a drive means and to electric vehicles (EVs) including hybrid vehicles such as hybrid electric vehicles (HEVs).

What is claimed is:

1. A travel controller for performing travel control of a host vehicle, the travel controller comprising:
    an information acquisition part configured to acquire brake state information of a braking device of the host vehicle and travelling road information, the travelling road information including information on whether a road on which the host vehicle travels is a descending road; and
    a travel control part configured to perform travel control,
    wherein the travel control performed includes constant speed travel control, headway travel control, or constant speed travel control and headway travel control,
    wherein the constant speed travel control is configured to control the host vehicle to travel at constant speed in accordance with a target vehicle speed,
    wherein the headway travel control is configured to control the host vehicle to travel by following another vehicle travelling ahead so that a target inter-vehicle distance is maintained with the other vehicle and the host vehicle travels in accordance with the target vehicle speed,
    wherein in the constant speed travel control, when an actual vehicle speed drops below the target vehicle speed, the travel control part is configured to
        calculate a target acceleration based on a difference between the target vehicle speed and the actual vehicle speed, and
        perform the constant speed travel control so that the actual vehicle speed is brought closer to the target vehicle speed,
    wherein when the target acceleration is calculated, if a braking performance index based on the brake state information acquired with the information acquisition part has declined relative to a predetermined evaluation threshold while the constant speed travel control has been in operation, then the target acceleration is corrected so that
        the target acceleration is reduced compared to if the braking performance index has not declined relative to the evaluation threshold, and
        the constant speed travel control is performed so that the actual vehicle speed is brought closer to the target vehicle speed based on the corrected target acceleration,
    wherein if, while the travel control is in operation, the information acquisition part acquires information that the road on which the host vehicle travels is a descending road from the travelling road information, the travel control part is configured to
        correct, when the target acceleration is calculated, the target acceleration so that the target acceleration is reduced compared to if the road on which the host vehicle travels is a flat road or an ascending road, and
        perform the travel control so that the actual vehicle speed is brought closer to the target vehicle speed based on the corrected target acceleration or an actual inter-vehicle distance is brought closer to the target inter-vehicle distance based on the corrected target acceleration,
    wherein a first degree of reduction is set to be greater than a second degree of reduction,
    wherein the first degree of reduction is a degree by which the target acceleration is reduced when, while the travel control is in operation, the road on which the host vehicle travels is a descending road compared to when the road on which the host vehicle travels is a flat road or an ascending road, and
    wherein the second degree of reduction is a degree by which the target acceleration is reduced when, while the travel control is in operation, the braking performance index has declined relative to the evaluation threshold compared to when the braking performance index has not declined relative to the evaluation threshold.

2. The travel controller according to claim 1,
    wherein the travel controller further includes a travel mode setting part,
    wherein the travel mode setting part is configured to be operated to selectively set a travel mode to one of a plurality of travel mode types that the host vehicle is equipped with, and
    wherein the travel control part is further configured to perform correction to adjust the target acceleration based on the travel mode that has been set with the travel mode setting part.

3. A travel controller for performing travel control of a host vehicle, the travel controller comprising:
    an information acquisition part configured to acquire brake state information of a braking device of the host vehicle and travelling road information, the travelling road information including information on whether a road on which the host vehicle travels is a descending road; and
    a travel control part configured to perform travel control,
    wherein the travel control performed includes constant speed travel control, headway travel control, or constant speed travel control and headway travel control,
    wherein the constant speed travel control is configured to control the host vehicle to travel at constant speed in accordance with a target vehicle speed,
    wherein the headway travel control is configured to control the host vehicle to travel by following another vehicle travelling ahead so that a target inter-vehicle distance is maintained with the other vehicle and the host vehicle travels in accordance with the target vehicle speed,
    wherein in the headway travel control, when an actual inter-vehicle distance widens more than the target inter-vehicle distance, the travel control part is configured to
        calculate a target acceleration based on a difference between the target inter-vehicle distance and the actual inter-vehicle distance, and
        perform the headway travel control so that the actual inter-vehicle distance is brought closer to the target inter-vehicle distance,
    wherein when the target acceleration is calculated, if a braking performance index based on the brake state information acquired with the information acquisition part has declined relative to a predetermined evaluation threshold while the headway travel control has been in operation, then the target acceleration is corrected so that the target acceleration is reduced compared to if the braking performance index has not declined relative to the evaluation threshold, and the headway travel control is performed so that the actual inter-vehicle distance is brought closer to the target inter-vehicle distance based on the corrected target acceleration, wherein if, while the travel control is in operation, the information acquisition part acquires information that the road on which the host vehicle travels is a descending road from the travelling road information, the travel control part is configured to correct, when the target acceleration is calculated, the target acceleration so that the target acceleration is reduced compared to if the road on which the host vehicle travels is a flat road or an ascending road, and perform the travel control so that the actual inter-vehicle distance is brought closer to the target inter-vehicle distance based on the corrected target acceleration or an actual vehicle speed is brought closer to the target vehicle speed based on the corrected target acceleration, wherein a first degree of reduction is set to be greater than a second degree of reduction, wherein the first degree of reduction is a degree by which the target acceleration is reduced when, while the travel control is in operation, the road on which the host vehicle travels is a descending road compared to when the road on which the host vehicle travels is a flat road or an ascending road, and wherein the second degree of reduction is a degree by which the target acceleration is reduced when, while the travel control is in operation, the braking performance index has declined relative to the evaluation threshold compared to when the braking performance index has not declined relative to the evaluation threshold.

4. The travel controller according to claim 3, wherein the travel controller further includes a travel mode setting part, wherein the travel mode setting part is configured to be operated to selectively set a travel mode to one of a plurality of travel mode types that the host vehicle is equipped with, and wherein the travel control part is further configured to perform correction to adjust the target acceleration based on the travel mode that has been set with the travel mode setting part.

\* \* \* \* \*